US012712928B2

(12) United States Patent
Tsuda

(10) Patent No.: US 12,712,928 B2
(45) Date of Patent: Aug. 18, 2026

(54) SESSION MANAGEMENT METHOD AND CONTROL METHOD

(71) Applicant: Sony Group Corporation, Tokyo (JP)

(72) Inventor: Shinichiro Tsuda, Kanagawa (JP)

(73) Assignee: SONY GROUP CORPORATION, Tokyo (JP)

(*) Notice: Subject to any disclaimer, the term of this patent is extended or adjusted under 35 U.S.C. 154(b) by 193 days.

(21) Appl. No.: 18/839,051

(22) PCT Filed: May 24, 2023

(86) PCT No.: PCT/JP2023/019303
§ 371 (c)(1),
(2) Date: Aug. 16, 2024

(87) PCT Pub. No.: WO2023/243341
PCT Pub. Date: Dec. 21, 2023

(65) Prior Publication Data

US 2025/0184373 A1 Jun. 5, 2025

(30) Foreign Application Priority Data

Jun. 13, 2022 (JP) ................................ 2022-095146

(51) Int. Cl.
*H04L 65/1069* (2022.01)

(52) U.S. Cl.
CPC ................................ *H04L 65/1069* (2013.01)

(58) Field of Classification Search
CPC .................................................. H04L 65/1069

(Continued)

(56) References Cited

U.S. PATENT DOCUMENTS

2022/0132295 A1 4/2022 Chen et al.
2022/0132454 A1 4/2022 Youn
2024/0372928 A1* 11/2024 Feng ...................... H04L 67/55

FOREIGN PATENT DOCUMENTS

WO 2020/144912 A1 7/2020

OTHER PUBLICATIONS

3GPP, "Technical Specification Group Services and System Aspects; 5G System Enhancements for Edge Computing; Stage 2 (Release 17)", 3GPP TS 23.548 V17.2.0, Mar. 2022, pp. 1-55.

(Continued)

*Primary Examiner* — Jirapon Tulop
(74) *Attorney, Agent, or Firm* — XSENSUS, LLP

(57) ABSTRACT

A Local Session Management Function (L-SMF) node located in a visitor network. The L-SMF node performs a method that includes: receiving a first N4 session establishment request from Central SMF (C-SMF) node located in a home network; transmitting a second N4 session establishment request message to a first User Plane Function (UPF) node; and transmitting a third N4 session establishment request message to a second UPF node which is a Local PDU Session Anchor (L-PSA). The third N4 session establishment request message includes information for causing the second UPF node to assign a first Data Network Name (DNN) for a Local Data Network (L-DN). The first DNN assigned for the L-DN is the same as a second DNN assigned for a Central Data Network connected to a third UPF node which is a Central PSA (C-PSA) with which a PDU session managed by the C-SMF is established.

19 Claims, 19 Drawing Sheets

(58) Field of Classification Search
USPC .......................................................... 370/352
See application file for complete search history.

(56) References Cited

OTHER PUBLICATIONS

Huawei et al., "TS 23.502 SMF selection in roaming case", Agenda Item: 6.5.3, SA WG2 Meeting #123, S2-178099 (revision of S2-177131,17877), Oct. 23-27, 2017, pp. 1-9.
International Search Report and Written Opinion mailed on Aug. 11, 2023, received for PCT Application No. PCT/JP2023/019303, filed on May 24, 2023, 16 pages.

* cited by examiner

[Fig. 8]
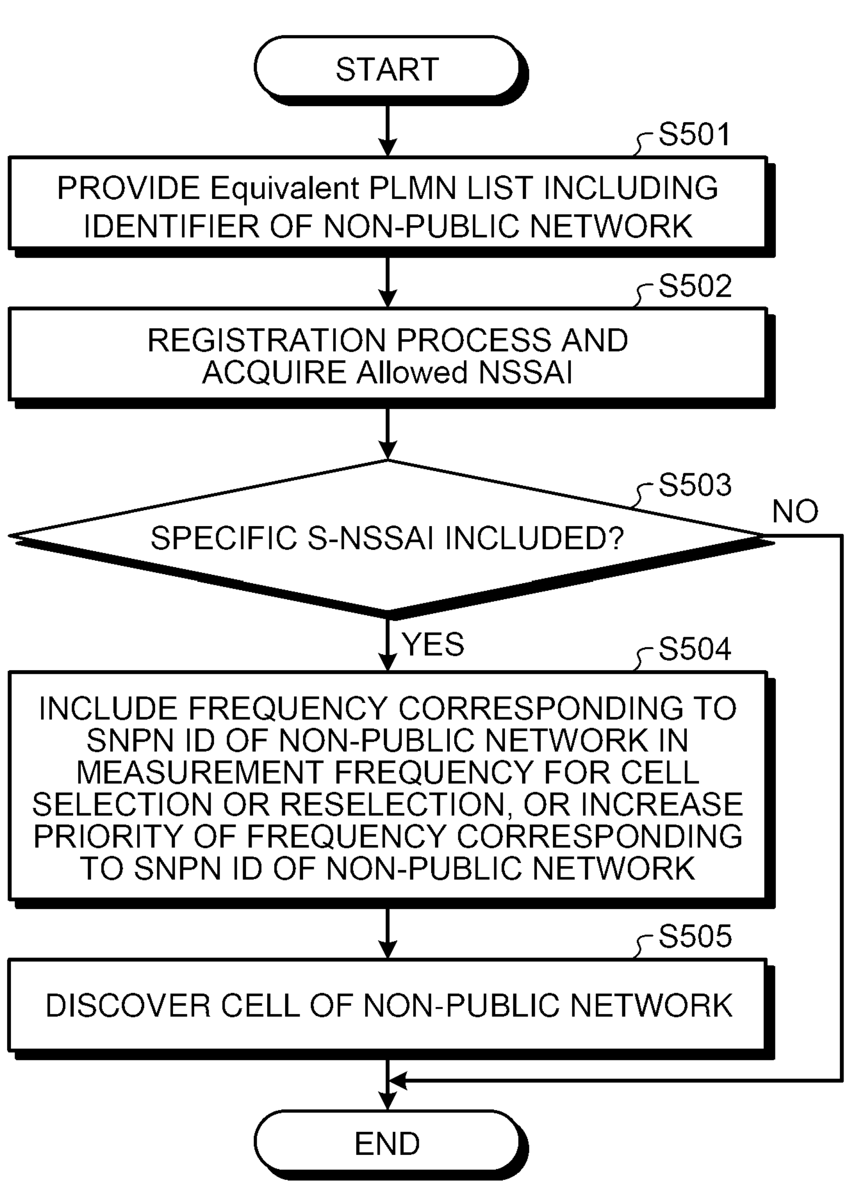

[Fig. 9]
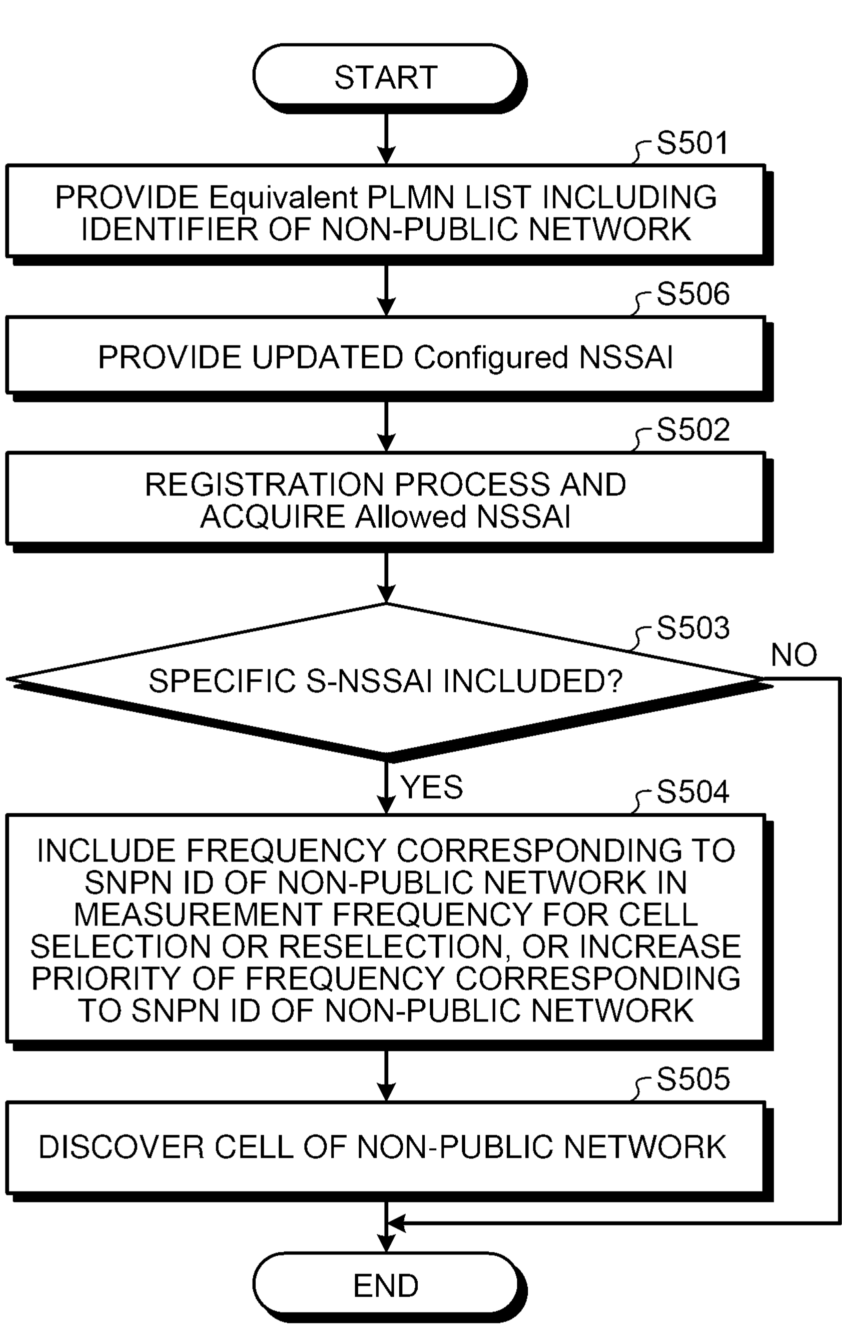

[Fig. 10]
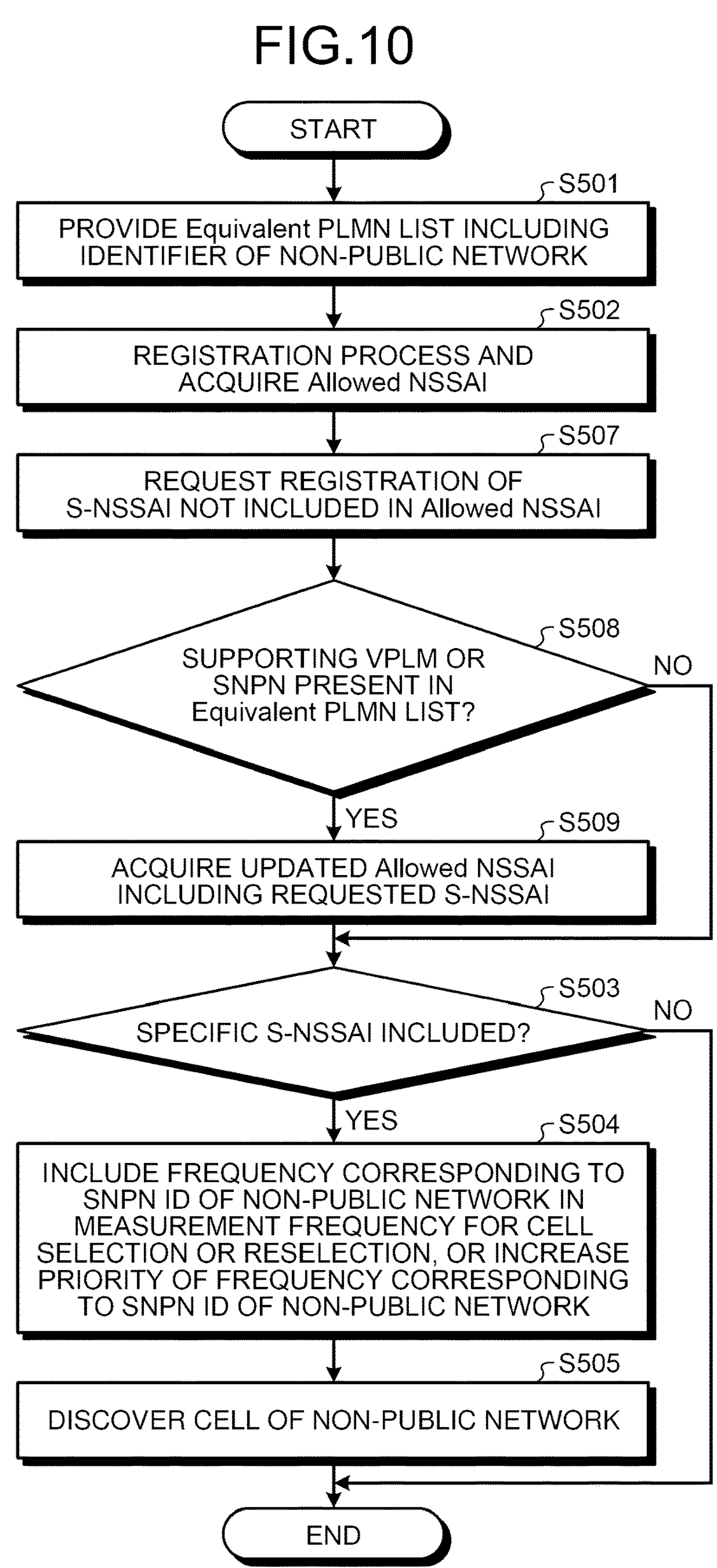

[Fig. 11]
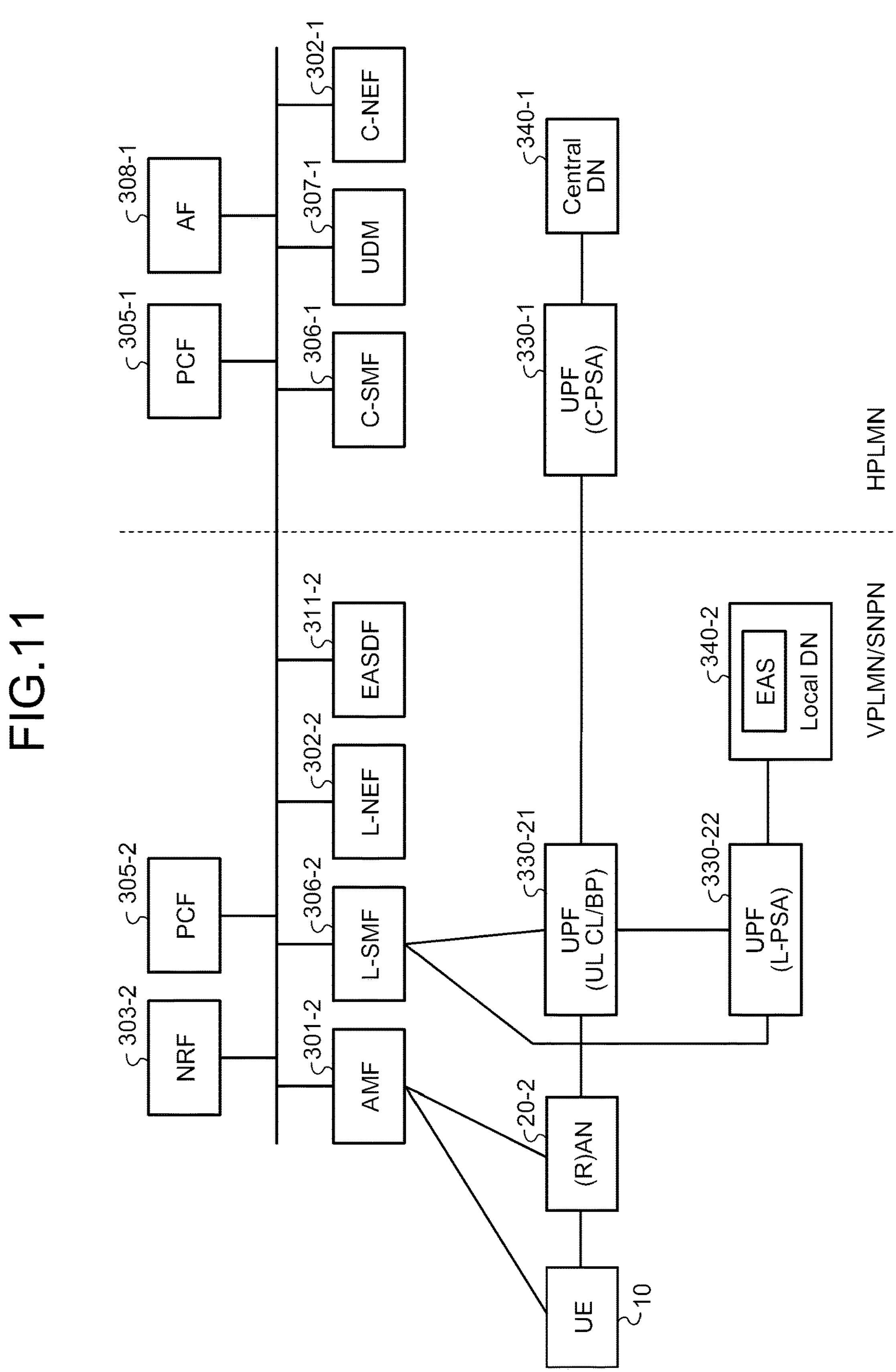

[Fig. 12]
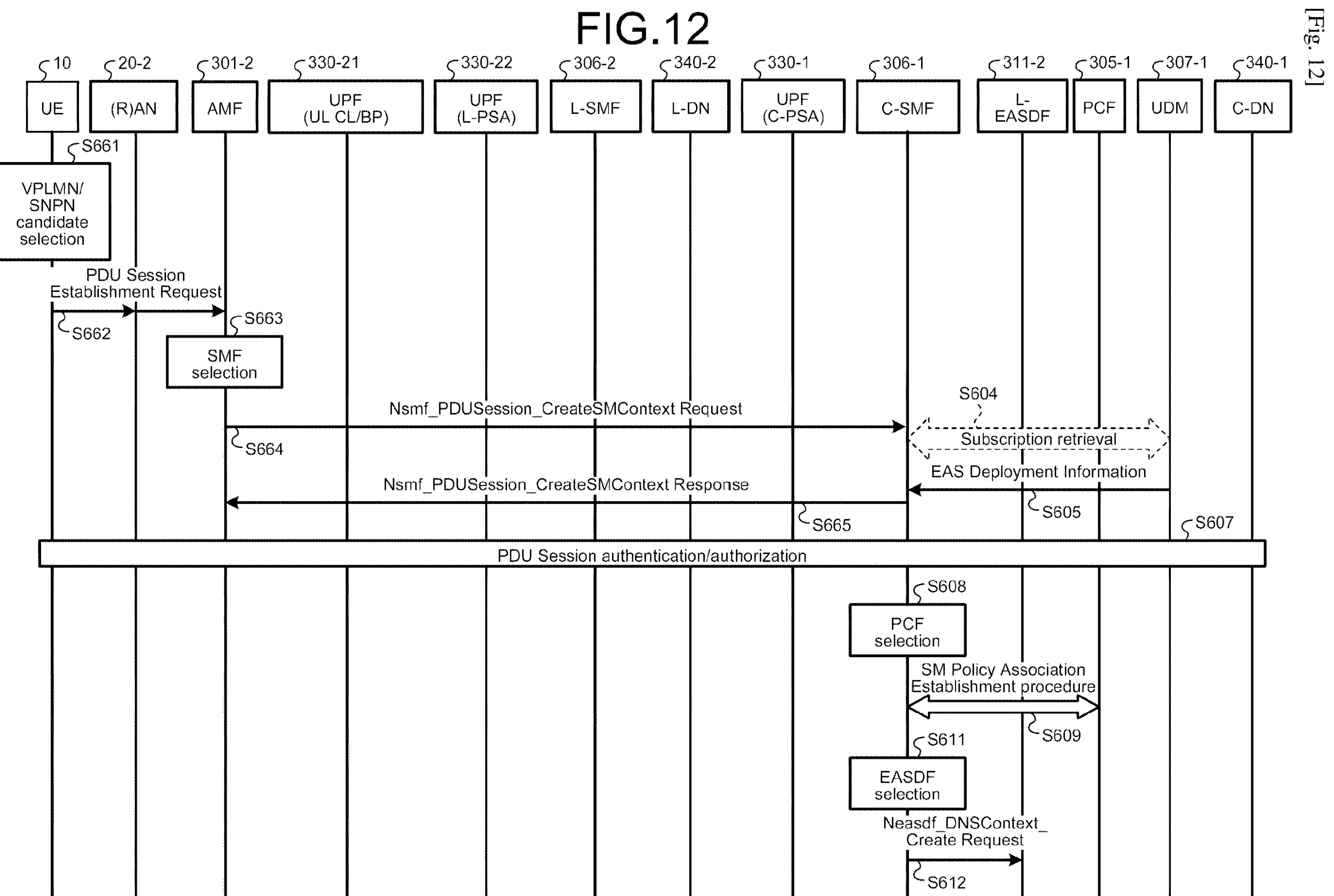

Figure 13:
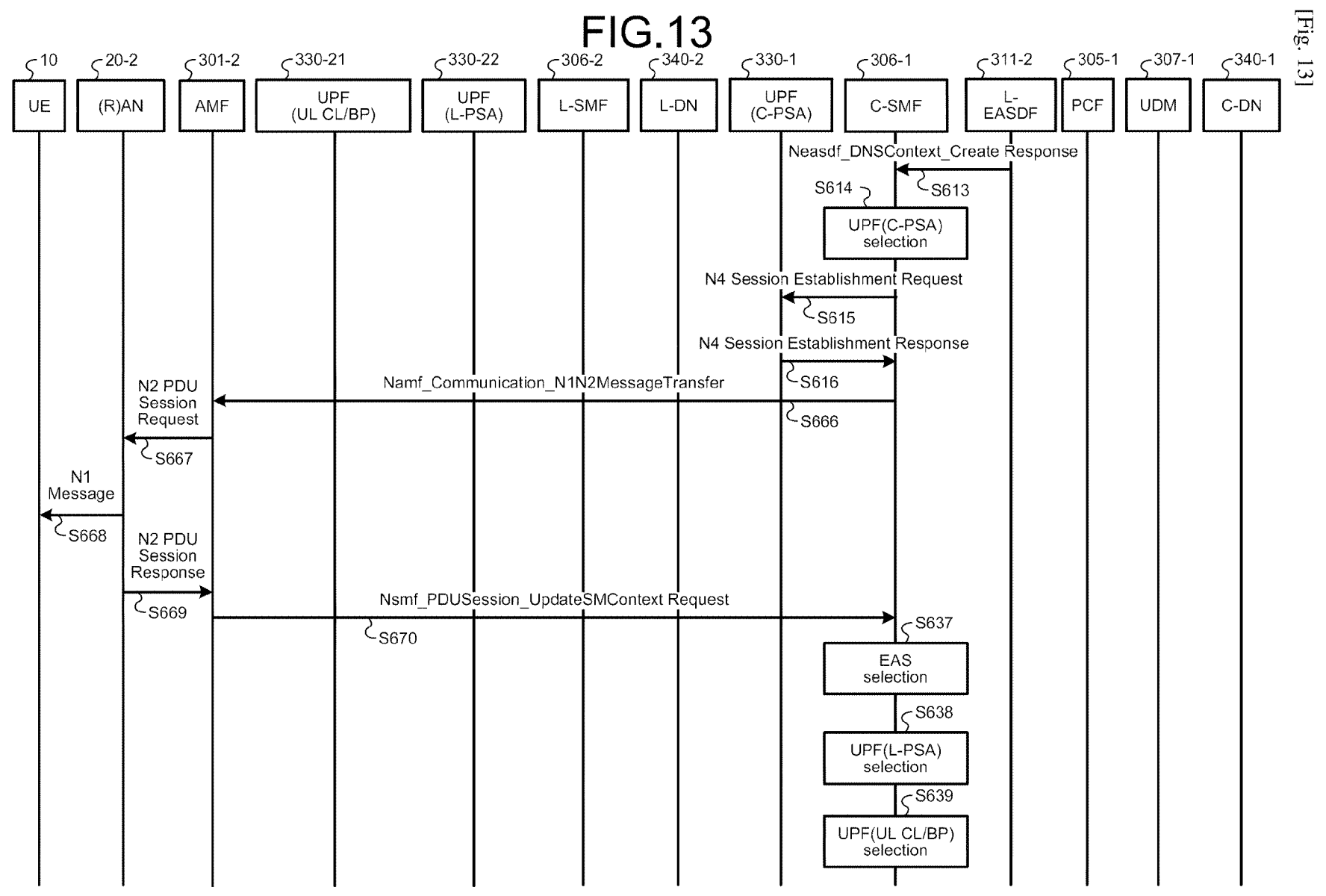

UE 10
(R)AN 20-2
AMF 301-2
UPF (UL CL/BP) 330-21
UPF (L-PSA) 330-22
L-SMF 306-2
L-DN 340-2
UPF (C-PSA) 330-1
C-SMF 306-1
L-EASDF 311-2
PCF 305-1
UDM 307-1
C-DN 340-1

S613 Neasdf_DNSContext_Create Response
S614 UPF(C-PSA) selection
S615 N4 Session Establishment Request
S616 N4 Session Establishment Response
S666 Namf_Communication_N1N2MessageTransfer
S667 N2 PDU Session Request
S668 N1 Message
S669 N2 PDU Session Response
S670 Nsmf_PDUSession_UpdateSMContext Request
S637 EAS selection
S638 UPF(L-PSA) selection
S639 UPF(UL CL/BP) selection

Figure 14:
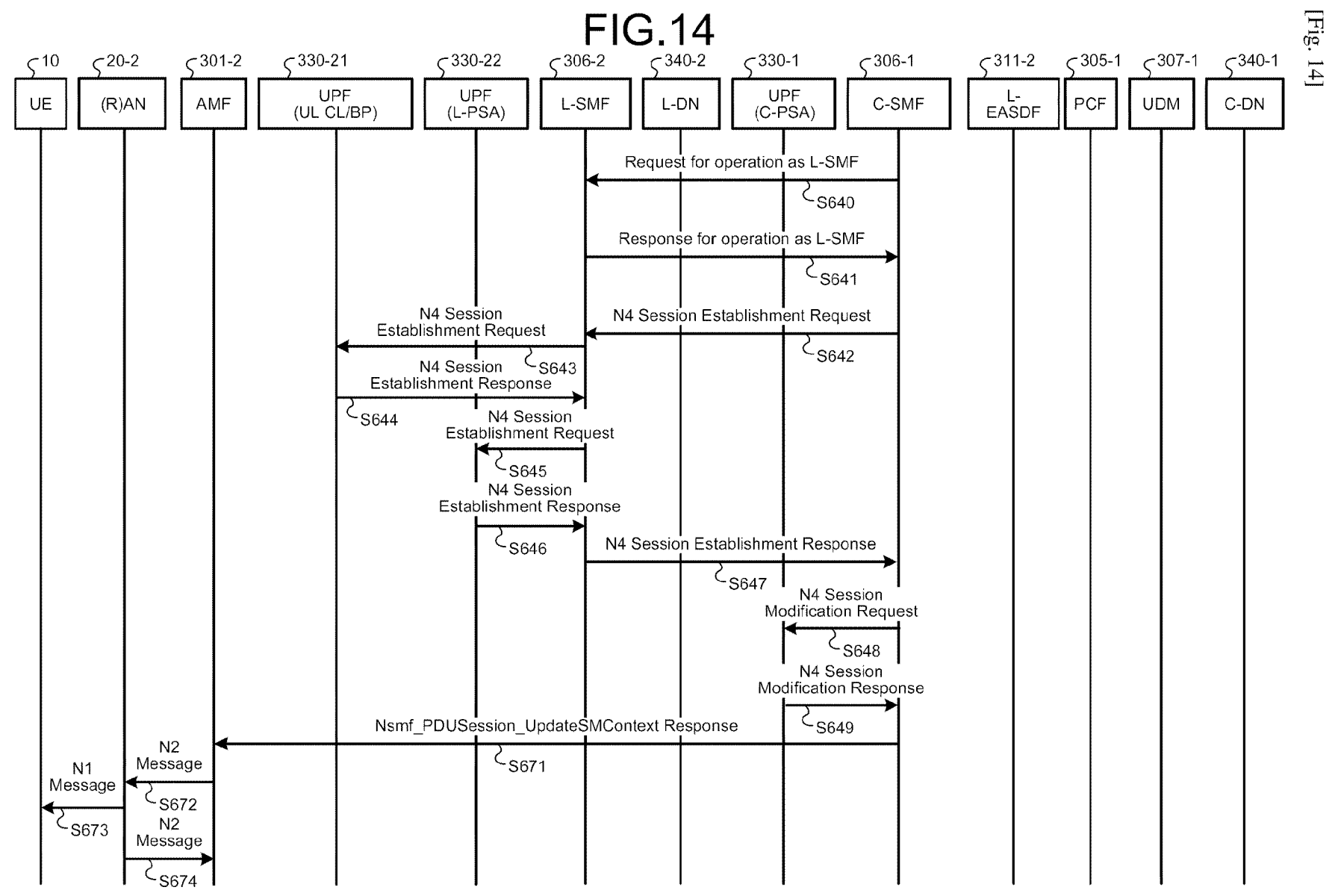

UE 10
(R)AN 20-2
AMF 301-2
UPF (UL CL/BP) 330-21
UPF (L-PSA) 330-22
L-SMF 306-2
L-DN 340-2
UPF (C-PSA) 330-1
C-SMF 306-1
L-EASDF 311-2
PCF 305-1
UDM 307-1
C-DN 340-1

Request for operation as L-SMF S640
Response for operation as L-SMF S641
N4 Session Establishment Request S642
N4 Session Establishment Request S643
N4 Session Establishment Response S644
N4 Session Establishment Request S645
N4 Session Establishment Response S646
N4 Session Establishment Response S647
N4 Session Modification Request S648
N4 Session Modification Response S649
Nsmf_PDUSession_UpdateSMContext Response S671
N2 Message S672
N1 Message S673
N2 Message S674

[Fig. 15]
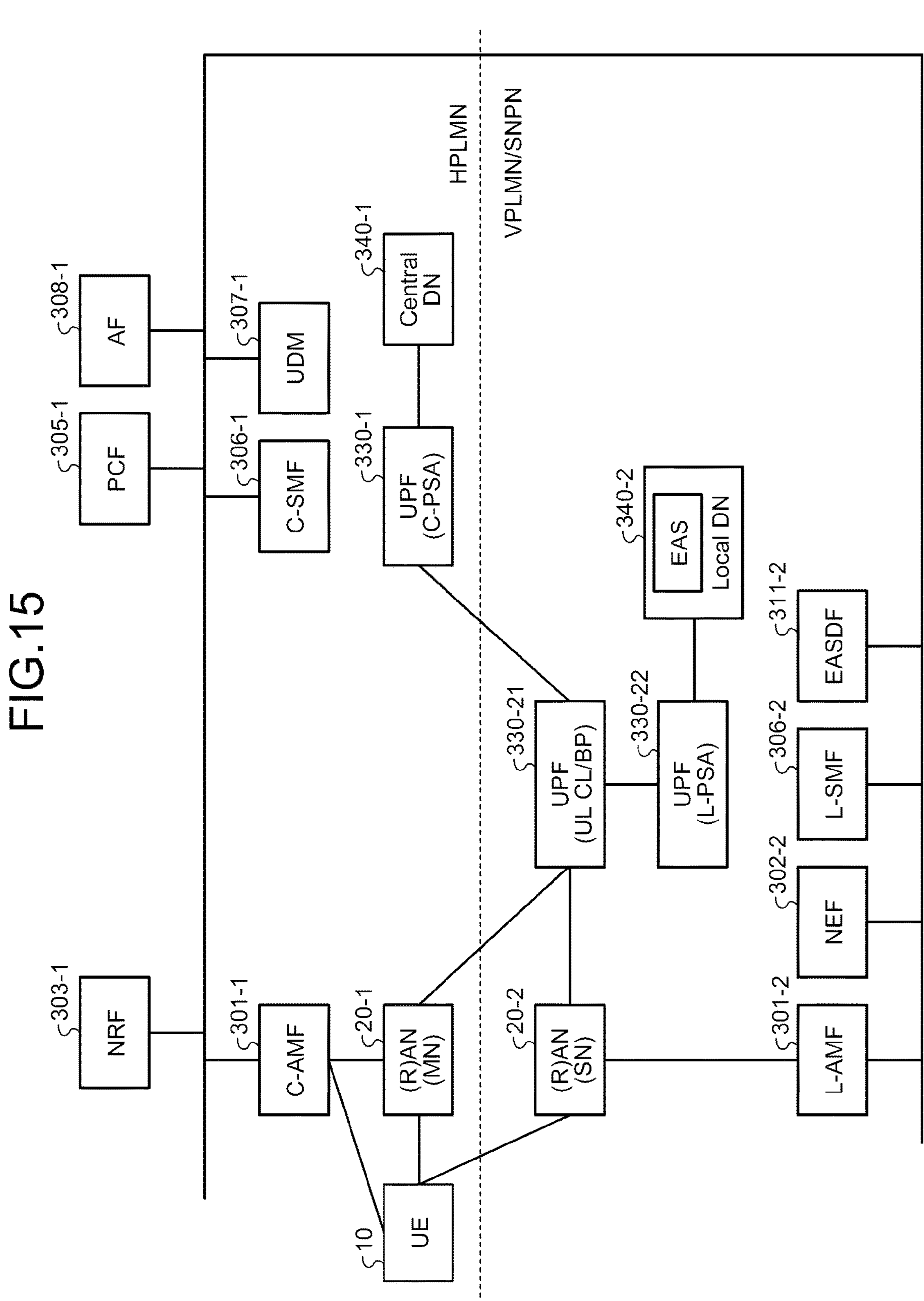

[Fig. 16]
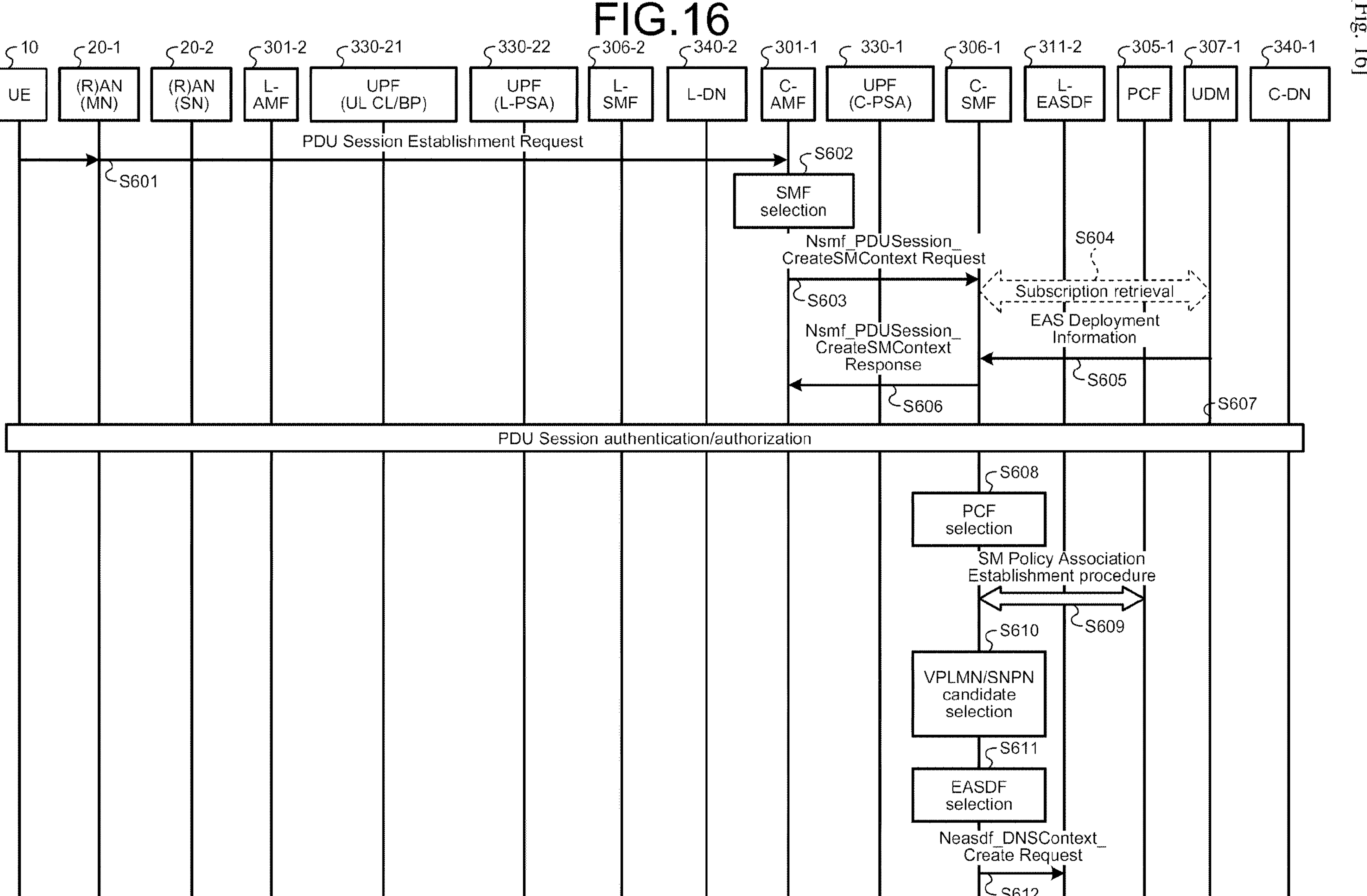

[Fig. 17]
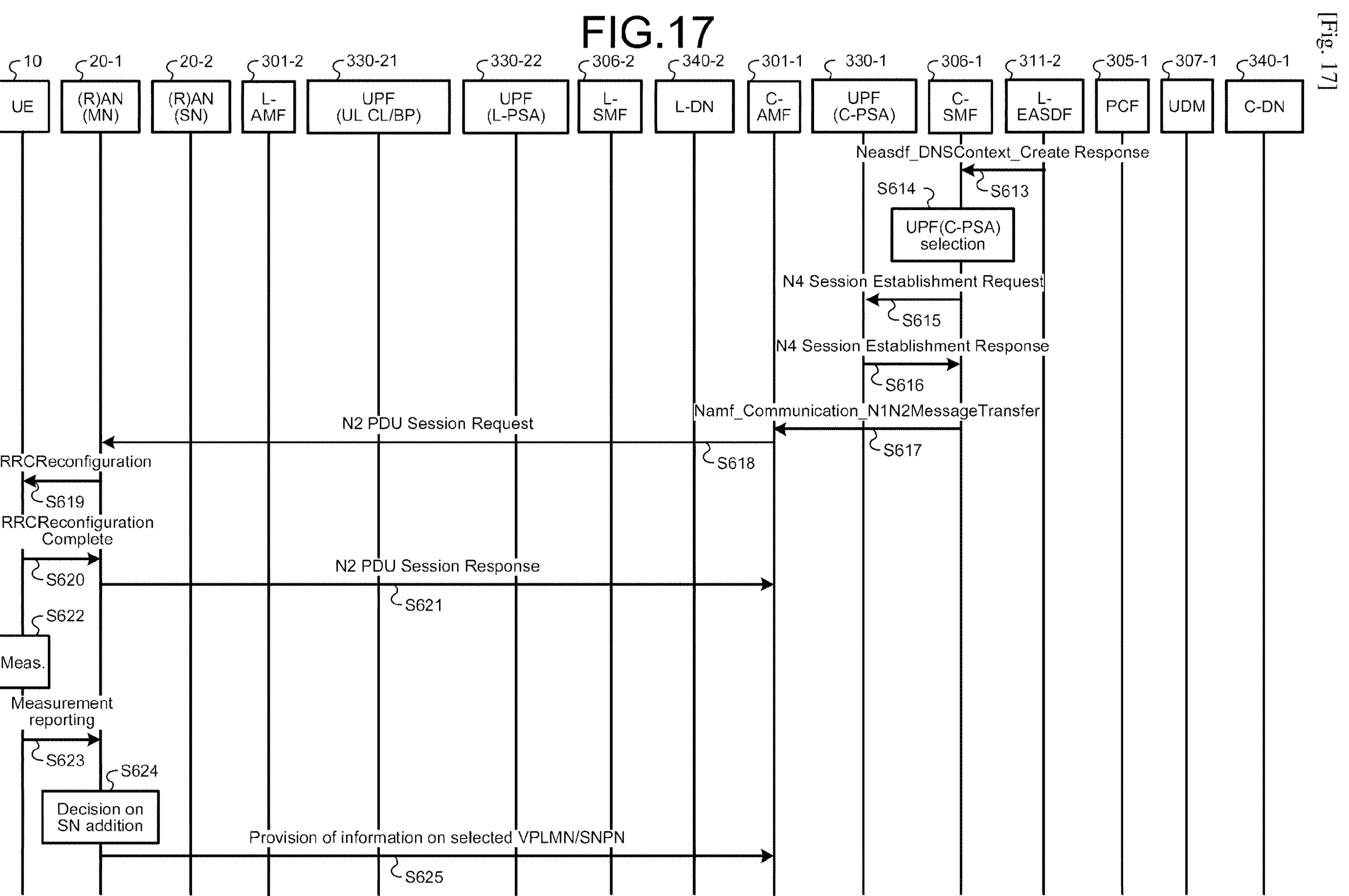

Figure 19:
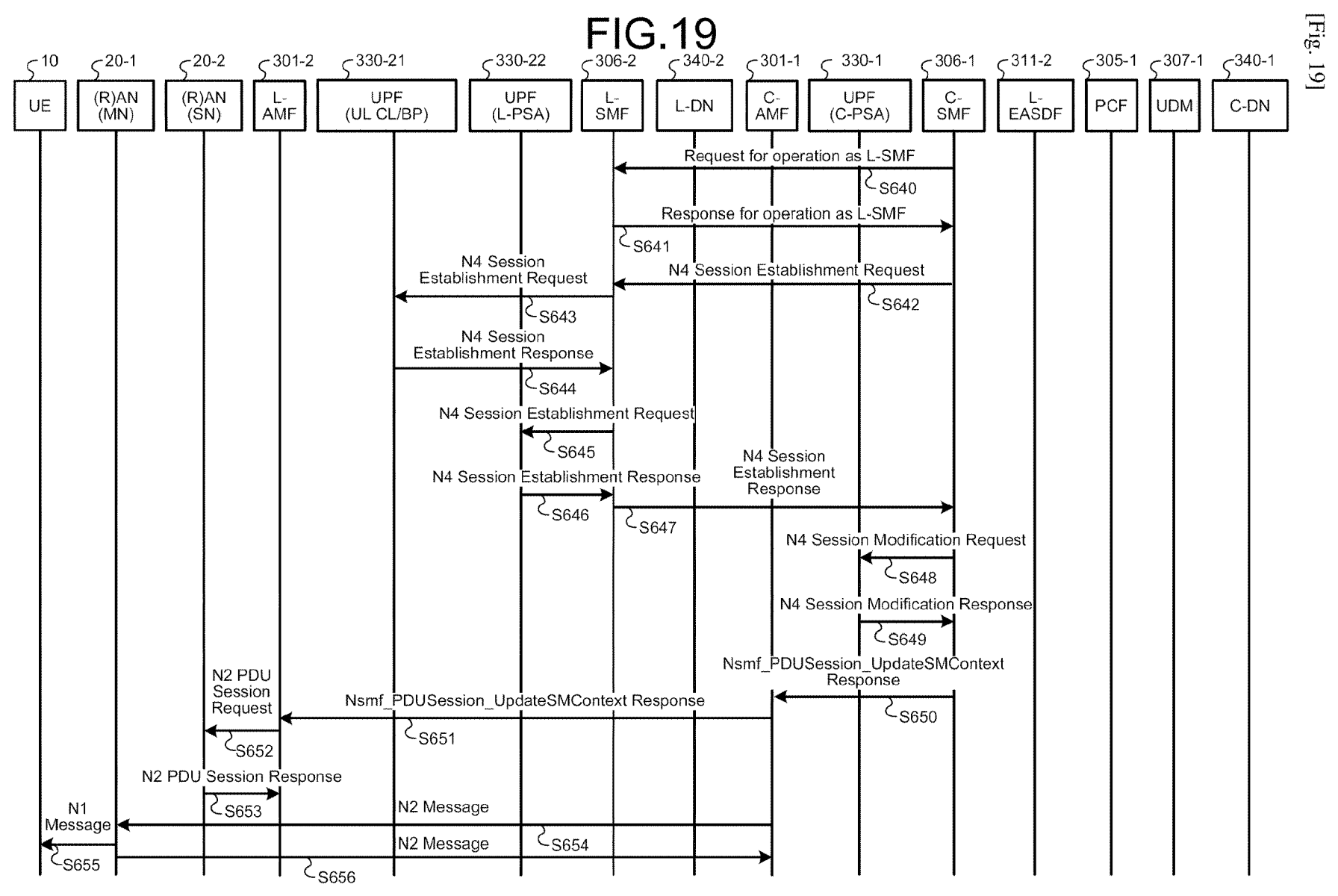

10 UE
20-1 (R)AN (MN)
20-2 (R)AN (SN)
301-2 L-AMF
330-21 UPF (UL CL/BP)
330-22 UPF (L-PSA)
306-2 L-SMF
340-2 L-DN
301-1 C-AMF
330-1 UPF (C-PSA)
306-1 C-SMF
311-2 L-EASDF
305-1 PCF
307-1 UDM
340-1 C-DN

S640 Request for operation as L-SMF
S641 Response for operation as L-SMF
S642 N4 Session Establishment Request
S643 N4 Session Establishment Request
S644 N4 Session Establishment Response
S645 N4 Session Establishment Request
S646 N4 Session Establishment Response
S647 N4 Session Establishment Response
S648 N4 Session Modification Request
S649 N4 Session Modification Response
S650 Nsmf_PDUSession_UpdateSMContext Response
S651 Nsmf_PDUSession_UpdateSMContext Response
S652 N2 PDU Session Request
S653 N2 PDU Session Response
S654 N2 Message
S655 N1 Message
S656 N2 Message

SESSION MANAGEMENT METHOD AND CONTROL METHOD

CROSS-REFERENCE TO RELATED APPLICATIONS

The present application is based on PCT filing PCT/JP2023/019303, filed May 24, 2023, which claims priority from Japanese Patent Application No. 2022-095146, filed Jun. 13, 2022, the entire contents of each are incorporated herein by reference.

TECHNICAL FIELD

The present disclosure relates to a session management method and a control method.

BACKGROUND ART

The first standard of the fifth generation mobile communication system, so-called 5G, was formulated as Rel-15 in 2018, and a 5G-compatible service was started in Japan in March 2020. In addition, service provision in a form of local 5G in which an entity other than a telecommunication carrier provides 5G service is also starting. The 5G has characteristics of high speed and large capacity (enhanced mobile broadband (eMBB)), low delay and high reliability (ultra-reliable and low latency communications (URLLC)), and simultaneously multiple connection (massive machine type communication (mMTC)).

The 5G is expected to be used for real-time transmission of 4K or 8K moving images because of characteristics of ultra-high speed, low delay and high reliability, and multiple simultaneous connection. In addition, the 5G capable of low delay transmission is expected to be used for connection to an edge server installed close to a base station device that provides a radio service, and effective use of a server managed by an entity other than a telecommunication carrier is expected.

PTL 1 discloses a radio communication system that constructs a private network by 5G using RAN sharing in a public network. In the radio communication system, instead of the core network of the public network, the private network is separated from the public network by connecting to a local core network, thereby ensuring security (see, for example, PTL 1).

CITATION LIST

Patent Literature

PTL 1: WO 2020/144912 A

SUMMARY OF INVENTION

Technical Problem

On the other hand, from the viewpoint of privacy and security, among data processed by a server, there is data that is difficult to use outside a device managed by a telecommunication carrier or a service provider. There is a demand for a mechanism for processing data processed by one application in a distributed manner by two networks while securing the security of some data handled by one application. In contrast, in an architecture for a current edge application server, a separate PDU session is required to be established for each network to implement this distributed processing. There is a problem that session management is complicated when multiple PDU sessions are established to process one application.

Therefore, the present disclosure proposes a session management method and a control method that are easy to manage.

Solution to Problem

A Local Session Management Function (L-SMF) node located in a visitor network, the L-SMF node comprising: one or more network interfaces; circuitry connected to the one or more network interfaces and configured to: receive a first N4 session establishment request from Central SMF (C-SMF) node located in a home network; transmit a second N4 session establishment request message to a first User Plane Function (UPF) node supporting an uplink classifier or a branching point; transmit a third N4 session establishment request message to a second UPF node which is a Local PDU Session Anchor (L-PSA), wherein the third N4 session establishment request message includes information for causing the second UPF node to assign a first Data Network Name (DNN) for a Local Data Network (L-DN), and wherein the first DNN assigned for the L-DN is the same as a second DNN assigned for a Central Data Network connected to a third UPF node which is a Central PSA (C-PSA) with which a PDU session managed by the C-SMF is established.

A method of communication performed by a Local Session Management Function (L-SMF) node located in a visitor network, the L-SMF node including one or more network interfaces and circuitry connected to the one or more network interfaces, the method comprising: receiving a first N4 session establishment request from Central SMF (C-SMF) node located in a home network; transmitting a second N4 session establishment request message to a first User Plane Function (UPF) node supporting an uplink classifier or a branching point; transmitting a third N4 session establishment request message to a second UPF node which is a Local PDU Session Anchor (L-PSA), wherein the third N4 session establishment request message includes information for causing the second UPF node to assign a first Data Network Name (DNN) for a Local Data Network (L-DN), and wherein the first DNN assigned for the L-DN is the same as a second DNN assigned for a Central Data Network connected to a third UPF node which is a Central PSA (C-PSA) with which a PDU session managed by the C-SMF is established.

BRIEF DESCRIPTION OF DRAWINGS

FIG. 8 is a diagram illustrating an example of a process for non-public network discovery.

FIG. 9 is a diagram illustrating another example of a process for non-public network discovery.

FIG. 10 is a diagram illustrating another example of a process for non-public network discovery.

FIG. 11 is a diagram illustrating an example of a configuration for connecting to an edge application server of a VPLMN in PDU session establishment according to the first embodiment of the present disclosure.

FIG. 12 is a diagram illustrating an example of a processing procedure according to the first embodiment of the present disclosure.

FIG. 13 is a diagram illustrating an example of a processing procedure according to the first embodiment of the present disclosure.

FIG. 14 is a diagram illustrating an example of a processing procedure according to the first embodiment of the present disclosure.

FIG. 15 is a diagram illustrating an example of a configuration connected to an edge application server of a VPLMN in PDU session establishment according to the second embodiment of the present disclosure.

FIG. 16 is a diagram illustrating an example of a processing procedure according to the second embodiment of the present disclosure.

FIG. 17 is a diagram illustrating an example of a processing procedure according to the second embodiment of the present disclosure.

Figure 18:
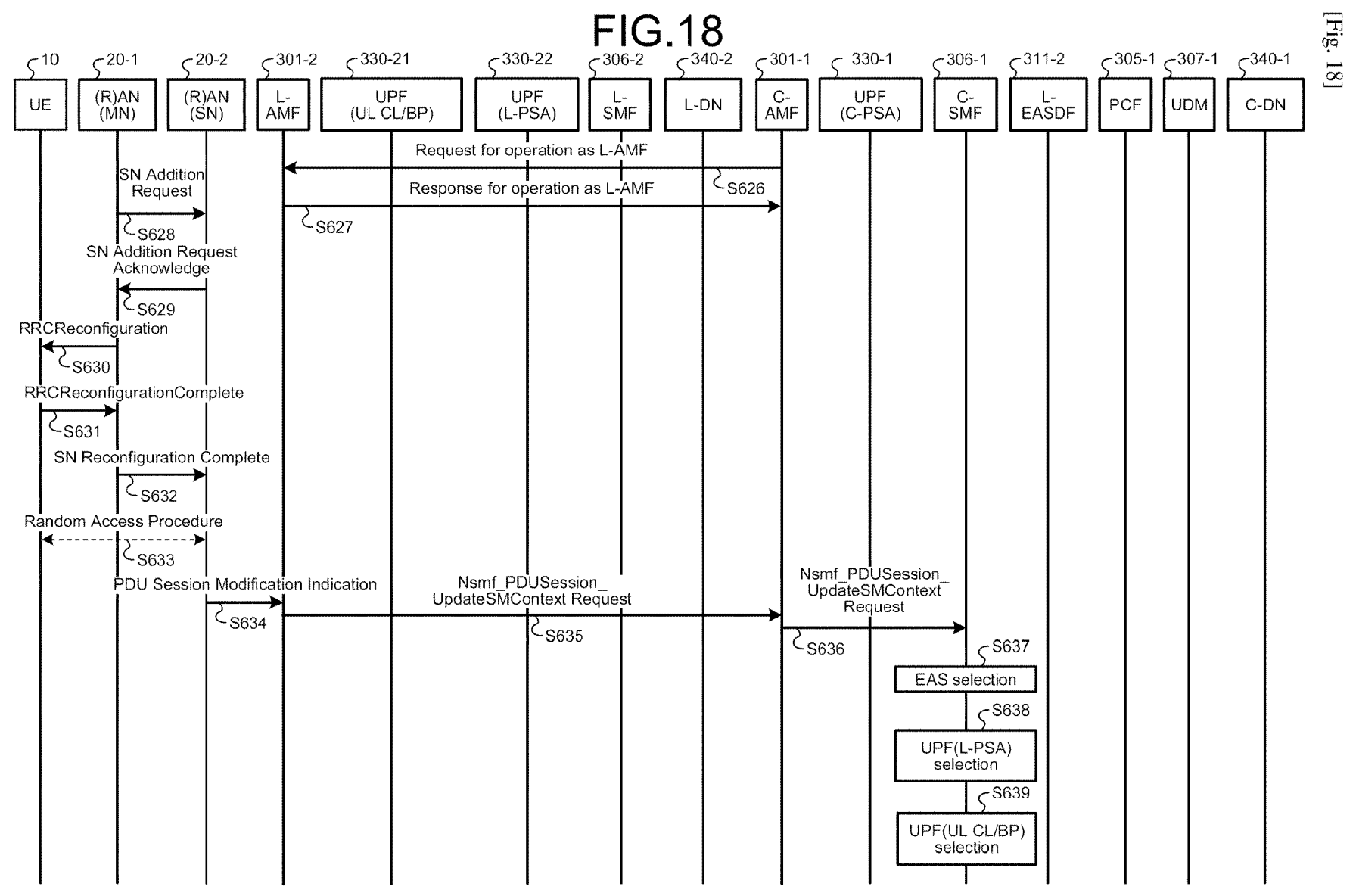

FIG. 18 is a diagram illustrating an example of a processing procedure according to the second embodiment of the present disclosure.

FIG. 19 is a diagram illustrating an example of a processing procedure according to the second embodiment of the present disclosure.

DESCRIPTION OF EMBODIMENTS

Figure 1:
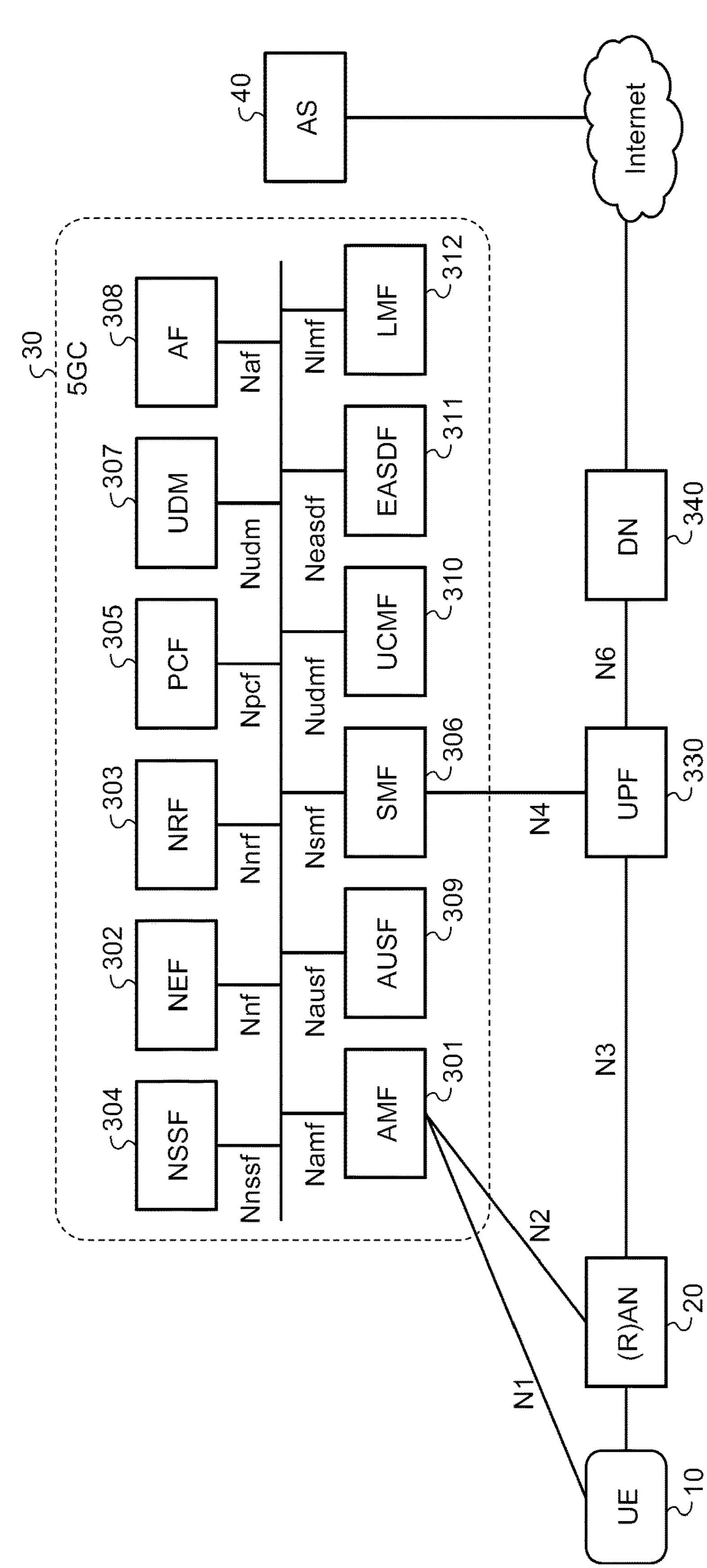
FIG. 1 is a diagram illustrating a configuration of a network architecture of a 5G system.

Hereinafter, the embodiments of the present disclosure will be described in detail with reference to the drawings. The description will be given in the following order. In the following embodiments, the same parts are denoted by the same reference signs, and a duplicate description will be omitted.

1. Network architecture of 5G system
2. Edge computing technology
3. Network configuration by public network and non-public network
4. Non-public network discovery procedure
5. Establishment of PDU session utilizing edge application server 5.1 First embodiment
5.2 Second embodiment
5.3 Summary
5.4 Supplementary description

1. Network Architecture of 5G System

FIG. 1 is a diagram illustrating a configuration of a network architecture of a 5G system. Hereinafter, the 5G system is abbreviated as a 5G system (5GS). The 5GS includes a user equipment (UE) 10, an (R)AN 20, and a 5G core (5GC) 30. Note that the 5GC is also referred to as an NG core (NGC) or a core network. In addition, the notation of the (R)AN represents a base station device including a radio access network (RAN) and an access network (AN).

When an application server (AS) 40 that processes an application is connected to the 5GS via the Internet, the UE 10 can use the application via the 5G service. In a case where an entity that provides an application, for example, a service provider has a contract such as a service level agreement (SLA) with a public land mobile network (PLMN) operator that provides a 5G service, the application server 40 can be disposed in the 5GC 30 as a DN 340, or the application server 40 and the DN 340 can be connected by a dedicated line or a virtual private network (VPN). Note that the application server 40 may be provided in the form of an edge server.

A control plane function group of the 5GS includes a plurality of network functions (NFs) including an access and mobility management function (AMF) 301, a network exposure function (NEF) 302, a network repository function (NRF) 303, a network slice selection function (NSSF) 304, a policy control function (PCF) 305, a session management function (SMF) 306, a unified data management (UDM) 307, an application function (AF) 308, an authentication server function (AUSF) 309, and a UE radio capability management function (UCMF) 310. Here, the AF 308 can operate as an NF that processes a control plane of the application server 40. The AF 308 may be implemented in the same device physically as an entity logically different from application server 40.

The UDM 307 includes a unified data repository (UDR) that holds and manages contractor information, and a front end (FE) unit that processes the contractor information. The AMF 301 performs mobility management. The SMF 306 performs session management.

The UCMF 310 holds UE radio capability information corresponding to all UE radio capability IDs in a public land mobile network (PLMN). The UCMF 310 is responsible for assigning each PLMN-assigned UE radio capability ID.

The Namf is a service-based interface (Service-based interface) provided by the AMF 301. The Nsmf is a service-based interface provided by the SMF 306. The Nnef is a service-based interface provided by the NEF 302. The Npcf is a service-based interface provided by the PCF 305. The Nudm is a service-based interface provided by the UDM 307. The Naf is a service-based interface provided by the AF 308. The Nnrf is a service-based interface provided by the NRF 303. The Nnssf is a service-based interface provided by the NSSF 304. The Nausf is a service-based interface provided by the AUSF 309. The Nucmf is a service-based interface provided by the UCMF 310. Each NF exchanges information with another NF via a service-based interface.

A user plane function (UPF) 330 has a function of user plane processing. The data network (DN) 340 has a function of enabling connection to a service unique to the mobile network operator (MNO), the Internet, and a third-party service. The UPF 330 functions as a transfer processing unit that transfers user plane data processed by the application server 40. The UPF 330 also functions as a gateway connected to the (R)AN 20.

The (R)AN 20 has a function of enabling connection to a radio access network (RAN) and connection to an access network (AN) other than the RAN. The (R)AN 20 includes a base station called a gNB or an ng-eNB. The RAN may also be referred to as a next generation (NG)-RAN.

The UE 10 and the AMF 301 mutually exchange information via a reference point N1. The (R)AN 20 and the AMF 301 mutually exchange information via a reference point N2. The SMF 306 and the UPF 330 mutually exchange information via a reference point N4.

2. Edge Computing Technology

Figure 2:
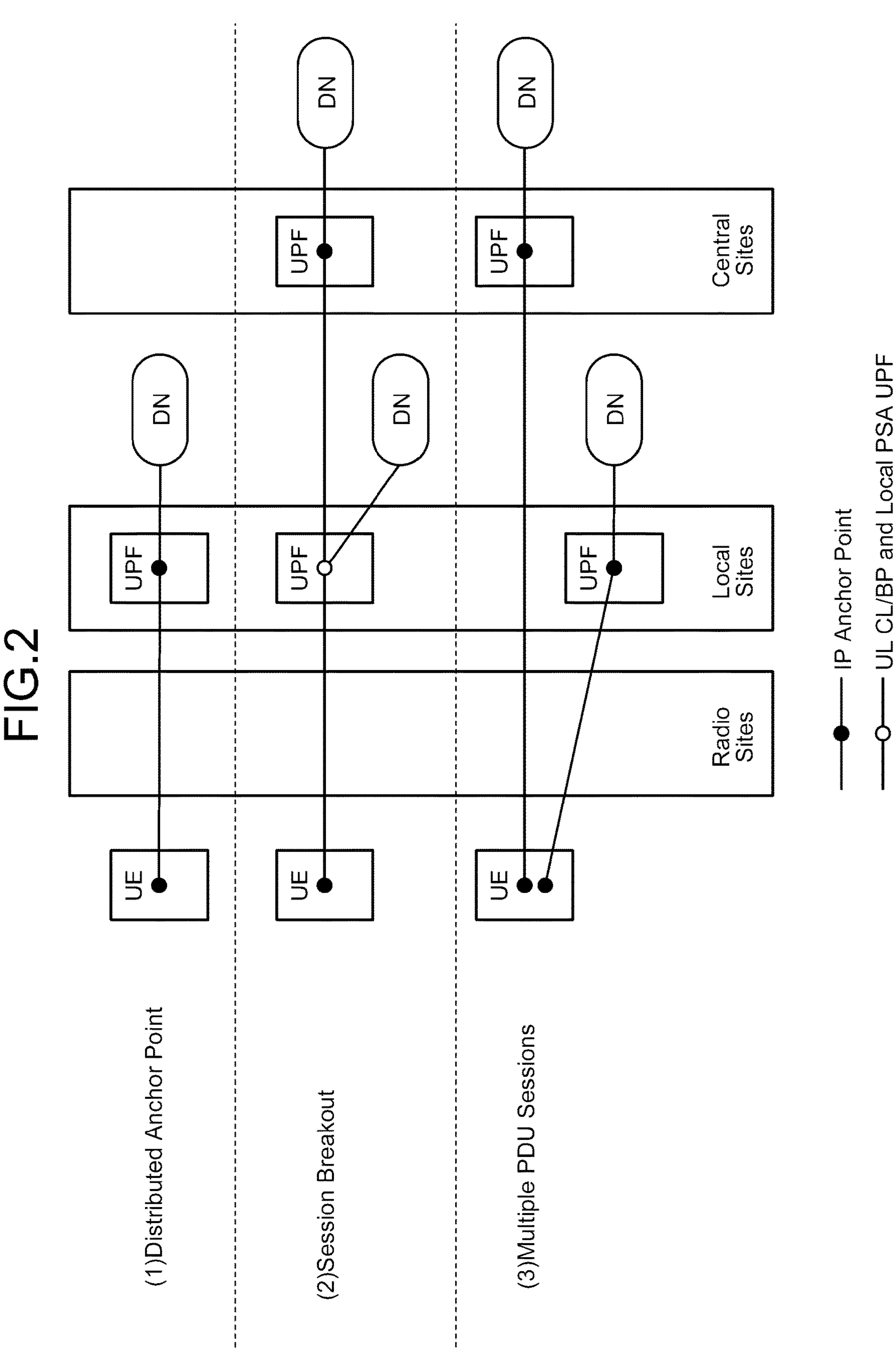
FIG. 2 is a diagram illustrating an example of a connectivity model for edge computing in a GC.

FIG. 2 is a diagram illustrating an example of a connectivity model for edge computing in a GC. Note that this figure and FIGS. 3 to 7 to be described later are based on the drawings described in the document "3GPP TS 23.548".

In the 5GC 30, at least three types of "distributed anchor point", "session breakout", and "multiple PDU sessions" are defined as a connectivity model for connection with an edge server that processes edge computing (Edge Computing).

(1) of the figure illustrates an example of the "distributed anchor point". The "distributed anchor point" is a connectivity model in which a PSA (PDU Session Anchor) UPF is installed at a local site (Local Site) near the UE 10 for one PDU session.

(2) of the figure illustrates an example of the "session breakout". The "session breakout" is a connectivity model in which, for one PDU session, a PSA UPF (C-PSA UPF) is installed at a central site (Central Site) and one or more PSA UPFs (L-PSA UPFs) are installed at a local site.

(3) of the figure illustrates an example of the "multiple PDU sessions". The "multiple PDU sessions" are a connectivity model in which an edge computing application uses a PDU session connected with a PSA UPF installed at a local site, and another application uses a PDU session connected with a PSA UPF installed at a central site.

Here, some or all functions of the application processed by the application server 40 are implemented in the DN 340. For example, some or all functions of the application are implemented in the DN 340 of a local site operating as an edge server in the "distributed anchor point", the "session breakout" or the "multiple PDU sessions". That is, the DN 340 installed at the local site operates as an edge application server. Here, some or all functions of this application are functions of processing data to be transmitted and received via a QoS flow that requests low latency.

Similarly, the AF 308 that processes the control plane of the application server 40 is configured in a distributed manner according to the function of the application implemented in the DN 340 at the central site or the DN 340 at the local site in a distributed manner.

Figure 3:
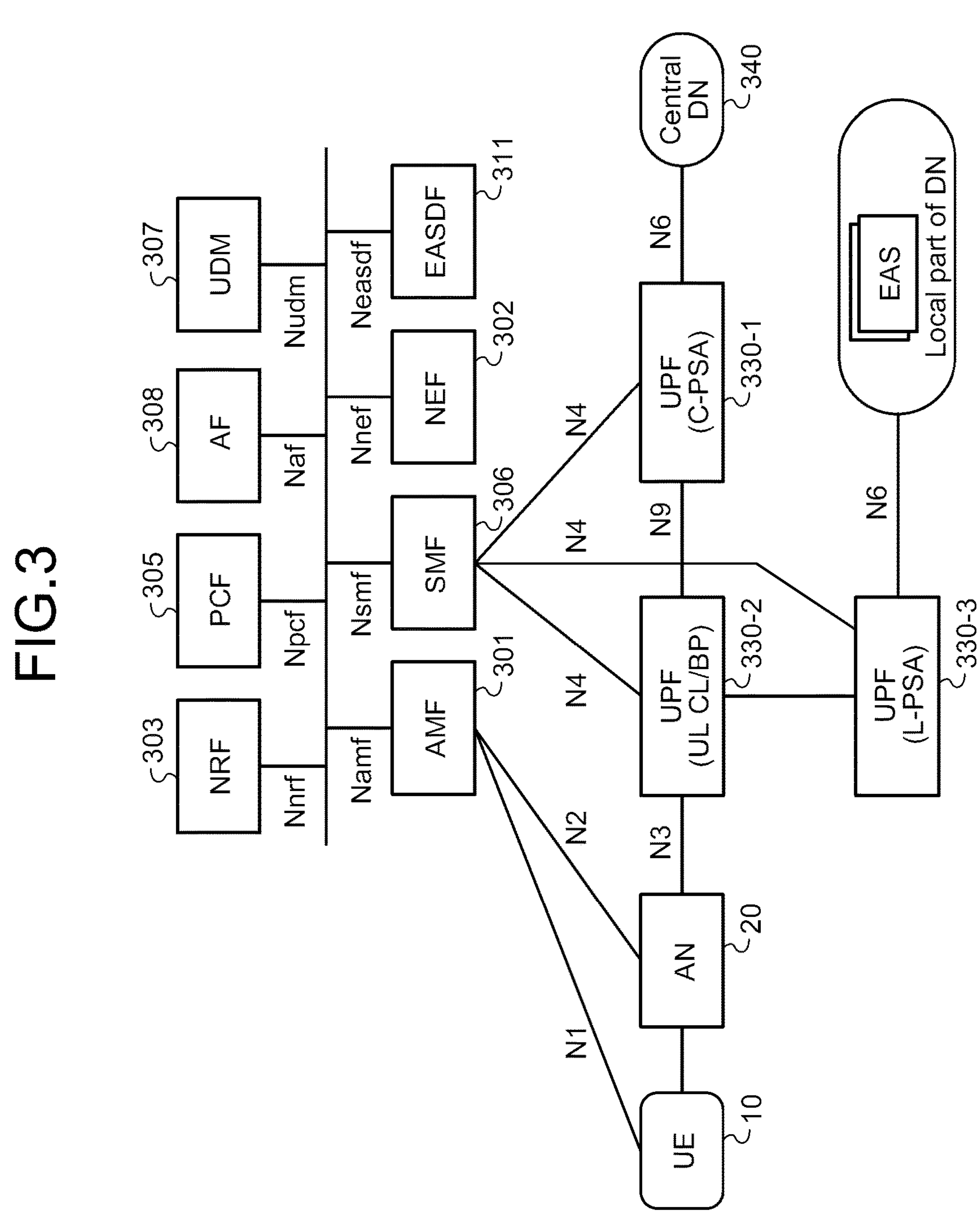
FIG. 3 is a diagram illustrating an example of an architecture for an edge application server during non-roaming.

FIG. 3 is a diagram illustrating an example of an architecture for an edge application server during non-roaming. This architecture is an architecture for connecting the DN (Local DN) 340 to which an edge application server is connected in one PLMN in one PDU session in a form of the "session breakout". The SMF 306 of the PLMN controls, via the N4 which is a reference point, the PSA UPF (C-PSA UPF) installed at a central site, the PSA UPF (L-PSA UPF) installed at a local site to connect with an edge application server, and the UPF supporting an uplink classifier (UL CL)/a branching point (BP). Here, the "session breakout" may be generally referred to as a local breakout.

Figure 4:
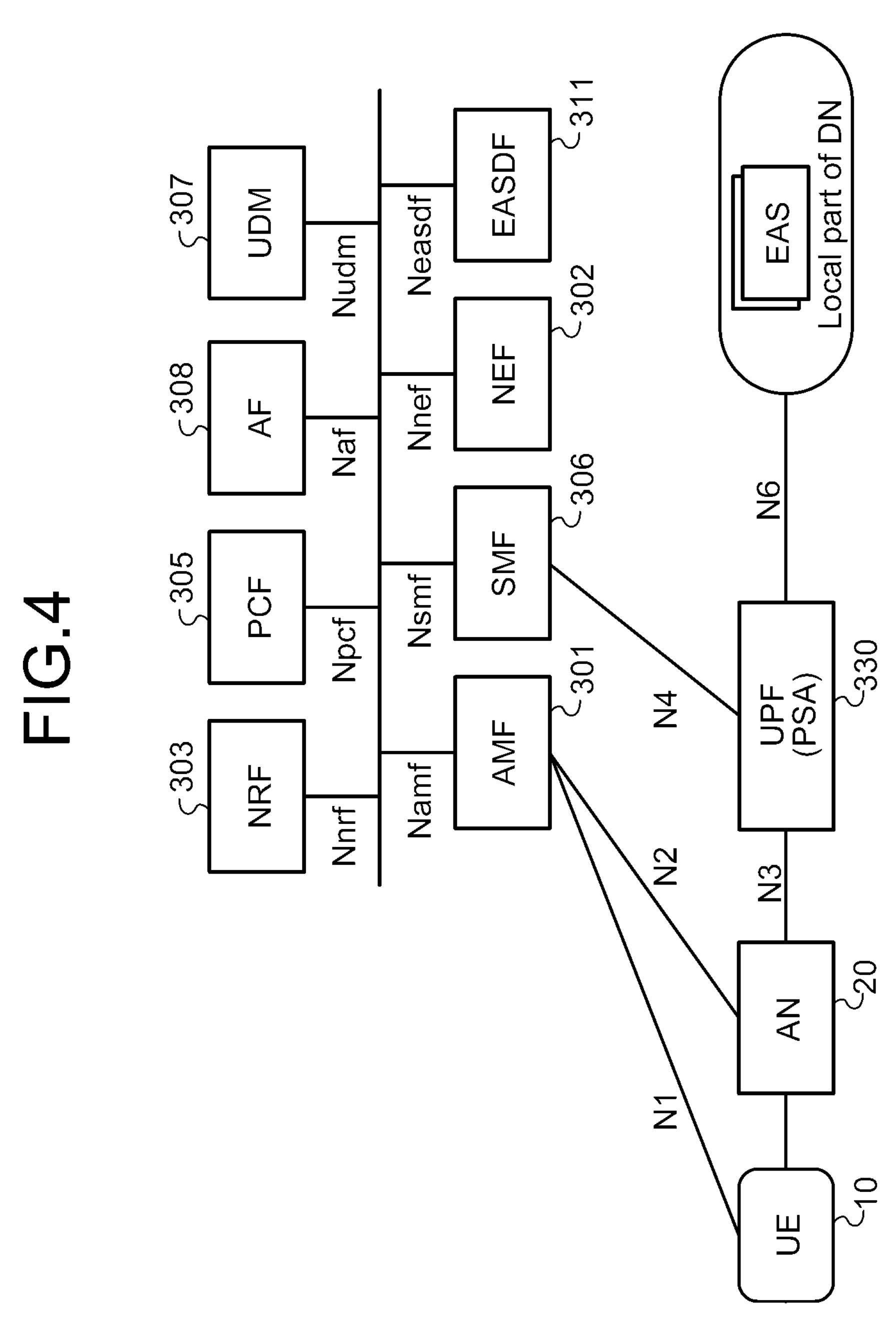
FIG. 4 is a diagram illustrating another example of an architecture for an edge application server during non-roaming.

FIG. 4 is a diagram illustrating another example of an architecture for an edge application server during non-roaming. This architecture is an architecture for connecting the local DN (Local DN) 340 to which an edge application server is connected in one PLMN in one PDU session in a form of the "distributed anchor point". The SMF 306 of the PLMN controls the PSA UPF installed to connect with the edge application server via the N4 which is a reference point.

Figure 5:
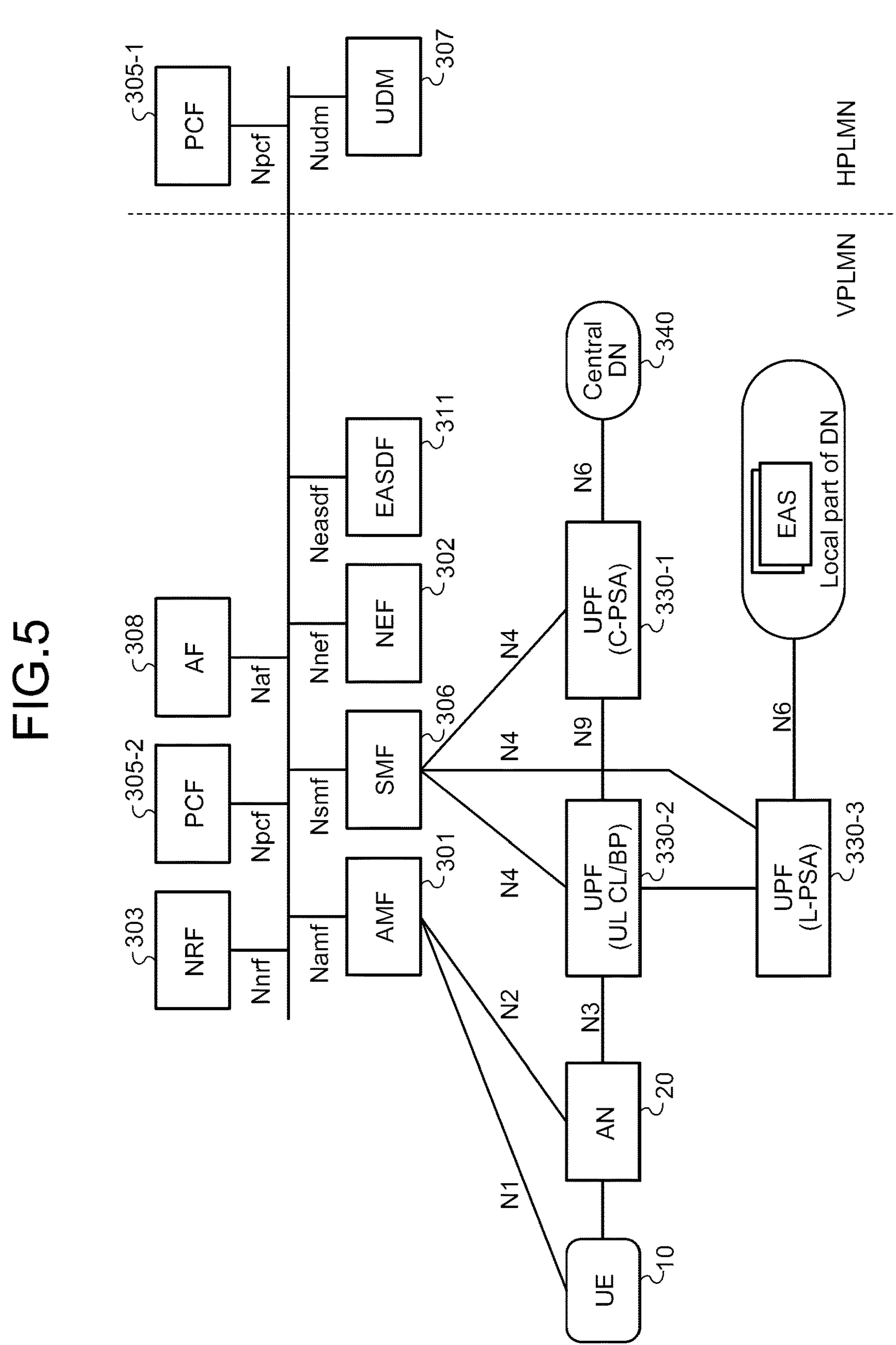
FIG. 5 is a diagram illustrating an example of an architecture for an edge application server during roaming.

FIG. 5 is a diagram illustrating an example of an architecture for an edge application server during roaming. This architecture is an architecture for connecting the DN (Local DN) 340 to which an edge application server is connected in a visitor PLMN (VPLMN) of a roaming destination in one PDU session in a form of the "session breakout". It includes the DN (Local DN) 340 connected to the edge application server, the PSA UPF (L-PSA UPF) installed at a local site for connecting to the edge application server, and the PSA UPF (C-PSA UPF) installed at the central site. The DN (Central DN) 340 at the central site is installed in the VPLMN of a roaming destination. The home PLMN (HPLMN) to be a home provides functions of a PCF 350 and the UDM 307 to the VPLMN to provide authentication, contract information, and policies.

Figure 6:
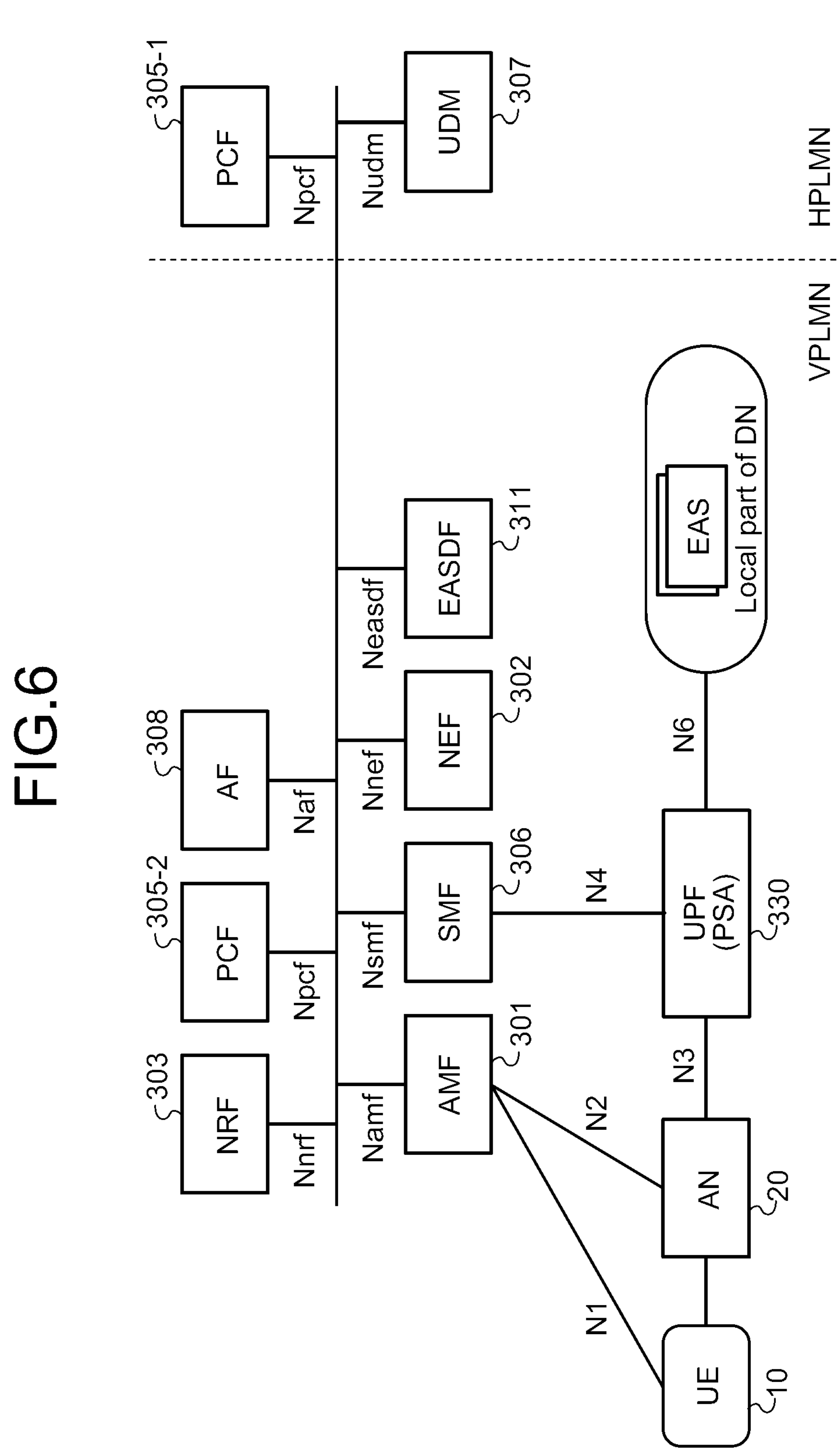
FIG. 6 is a diagram illustrating another example of an architecture for an edge application server during roaming.

FIG. 6 is a diagram illustrating another example of an architecture for an edge application server during roaming. This architecture is an architecture for connecting the DN (Local DN) 340 to which an edge application server is connected in the VPLMN of a roaming destination in one PDU session in a form of the "distributed anchor point". The SMF 306 of the VPLMN of the roaming destination controls the PSA UPF installed to connect with the edge application server via the N4 which is a reference point. The HPLMN to be a home provides functions of the PCF 350 and the UDM 307 to the VPLMN to provide authentication, contract information, and policies.

In the above-described architecture, it is not possible to provide a mechanism for processing data processed by one application in a distributed manner by two networks while securing security of some data handled by one application described as a problem.

3. NETWORK CONFIGURATION by Public Network and Non-Public Network

<Configuration of Network>

Figure 7:
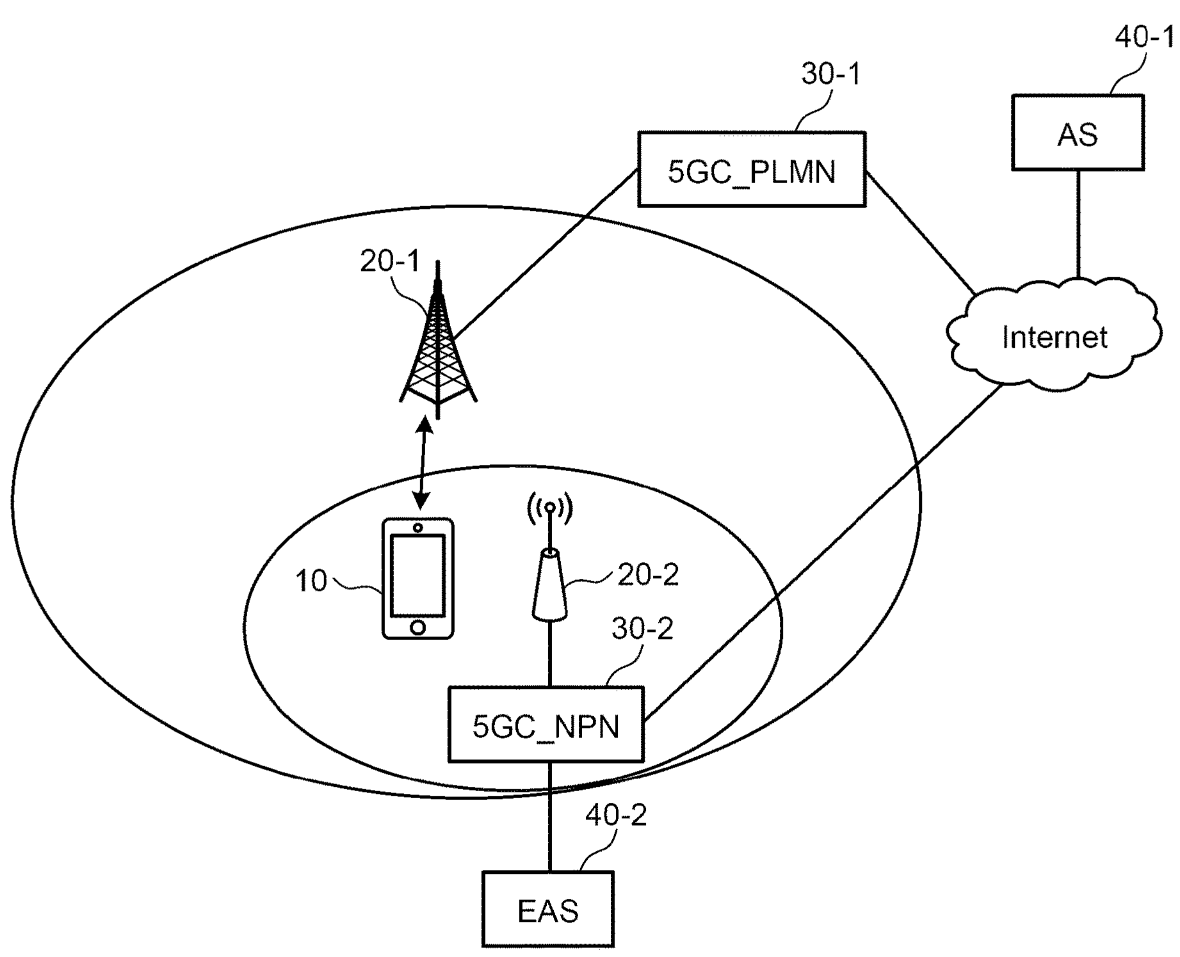
FIG. 7 is a diagram illustrating an example of a network configuration by a public network and a non-public network.

FIG. 7 is a diagram illustrating an example of a network configuration by a public network and a non-public network. The public network in the figure includes an (R)AN 20-1 and a 5GC 30-1 that function as a central site. The non-public network in the figure includes an (R)AN 20-2 and a 5GC 30-2 that function as a local site, and an edge application server 40-2. Here, the non-public network may be a network in a form called a local 5G, a private network, or a local area network.

The non-public network may be operated and/or managed by various entities. It is assumed that examples of the entity include a mobile virtual network operator (MVNO), a mobile virtual network enabler (MVNE), a neutral host network (NHN) operator, a non-public network (Non-Public Network) operator, an enterprise, a province autonomous community, an educational institution (school, board of education of a local government, etc.), a real estate (building, apartment, etc.) administrator, a game facility administrator, a commercial facility administrator, a road administrator, a port administrator, an airport administrator, a safe driving support service operator, an individual, and the like.

An application server 40-1 managed by the service provider is connected to a public network and a non-public network via the Internet. Here, the application server 40-1 may be implemented in the DN 340 in a public network managed and operated by a public land mobile network (PLMN).

The UE 10 has a subscription (contract) using the service provided by the PLMN, and can use the radio communication service of the public network. In addition, the UE 10 can use the radio communication service of the non-public network by entering into a subscription contract with a company that manages and operates the non-public network as necessary. In addition, when the PLMN concludes a service level agreement (SLA) with a company that manages and operates a non-public network, the UE 10 having a subscription to the PLMN can use a radio communication service as a visitor PLMN (VPLMN) in a form of roaming via the non-public network.

The non-public network alone can provide the 5G service to the UE 10 in the form of a standalone (SA) in the stand-alone non-public network (SNPN). In addition, the (R)AN 20-2 of the non-public network operates as a secondary node (SN) of the (R)AN 20-1 of the public network operating as a master node (MN). In this case, a radio communication service of a public network can be used in a form of dual connectivity (DC).

The (R)AN 20-2 of the non-public network can also perform communication with the vehicle equipped with the UE 10, that is, Vehicle to X (V2X) communication via the Uu interface. The V2X communication is a concept including Vehicle to Vehicle (V2V) which means communication between vehicles, Vehicle to Infrastructure (V2I) which means communication between a vehicle and an infrastructure device installed on a road, Vehicle to Pedestrian (V2P) which means communication between a vehicle and a pedestrian, and Vehicle to Network (V2N) which means communication between a vehicle and a network such as a cloud. For example, the (R)AN 20-2 in a non-public network may be a road side unit (RSU) that provides V2N communication. The road side unit may support Slidelink communication via the PC5 interface to provide V2I ( ) communication.

The road side unit is equipped with a camera (image sensor), a light detection and ranging (LiDAR), a millimeter wave radar, and the like, and assists driving support and automatic driving on an exclusive road or a public road. The road side unit provides, for example, positional information about a vehicle on which the UE 10 is mounted, information about a traffic light, information about a dynamic map, and the like.

The dynamic map is map information obtained by adding various traffic information and the like to a highly accurate three-dimensional map. The dynamic map includes a layer of static information including road surface information, lane information, and the like which are highly accurate three-dimensional maps, a layer of semi-static information including schedule information about traffic regulations and road construction, and the like, a layer of semi-dynamic information including accident information, congestion information, and the like, and a layer of dynamic information including surrounding vehicles, pedestrian information, and the like.

Although an example in which a non-public network provides the (R)AN 20-2 at a local site is described here, the examples disclosed below are not limited thereto. For example, the (R)AN 20-2 at the local site may be provided by another PLMN in which the PLMN has a roaming agreement.

4. Non-Public Network Discovery Procedure

A subscriber of the public network searches for a private network or a non-public network as necessary. For example, when using a private network or a non-public network that can provide an edge application server, it searches for the private network or the non-public network within the service range of the public network. However, it is not necessarily easy to discover the private network or the non-public network. Therefore, a procedure for discovering a private network or a non-public network will be described.

The UE 10 having the subscription to the PLMN can camp on a suitable cell (Suitable Cell) basically from among cells in the PLMN by the cell selection or reselection process. When the UE 10 is out of service of the PLMN, it can discover a cell of the (R)AN 20-2 of a non-public network having a roaming agreement with the PLMN. On the other hand, when the UE 10 is within the service range of the PLMN, it is difficult to discover the cell of the (R)AN 20-2 of the non-public network.

FIG. 8 is a diagram illustrating an example of a process for non-public network discovery. First, the AMF 301 of the PLMN provides the UE 10 with an Equivalent PLMN list including the SNPN ID of the non-public network with a roaming agreement with the PLMN (step S501). Here, the Equivalent PLMN list is provided at the timing when the contents of the Equivalent PLMN list change, at the timing when the tracking area (TA), the registration area (RA), and the RAN-based notification arca (RNA) are updated, or at the timing when a request for updating the Equivalent PLMN list is received from the UE 10. Note that the mobile equipment (ME) constituting the UE 10 may store the acquired Equivalent PLMN list as part of information in the Elementary File_EHPLMN (EF_EHPLMN) of the universal subscriber identity module (USIM).

The UE 10 acquires Allowed network slice selection assistance information (NSSAI) through the registration process of the PLMN in the network (step S502). When the acquired Allowed NSSAI includes specific single network slice selection assistance information (S-NSSAI) (step S503, Yes), the UE 10 includes the frequency corresponding to the SNPN ID of the non-public network in the measurement frequency for cell selection or reselection, or increases the priority of the frequency corresponding to the SNPN ID of the non-public network (step S504).

Here, the specific S-NSSAI is a network slice for a service using an edge application server, a network slice for a service requiring low latency, or the like. Here, the specific S-NSSAI may be configured in advance as a list including candidates for one or more pieces of S-NSSAI.

Next, the UE 10 can discover the cell of the (R)AN 20-2 of the non-public network by performing cell selection or reselection based on the updated measurement frequency or priority (step S505). Note that, in step S503, in a case where the acquired Allowed NSSAI does not include specific single network slice selection assistance information (S-NSSAI) (step S503, No), the UE 10 ends the process.

Through the above processing, the UE 10 can discover the cell of the (R)AN 20-2 in the non-public network even in a case of the service range of the PLMN. Further, the UE 10 can limit the measurement therefor to a specific condition (for example, in a case where specific S-NSSAI is registered). Therefore, the load of measurement can be reduced.

FIG. 9 is a diagram illustrating another example of a process for non-public network discovery. First, the process of step S501 described in FIG. 8 is performed. Next, when the Configured NSSAI is updated, the AMF 301 of the PLMN provides the updated Configured NSSAI to the UE 10 (step S506). The Configured NSSAI includes S-NSSAI corresponding to a network slice provided by a non-public network having an SLA for roaming. The timing at which the Configured NSSAI is provided to the UE 10 is, for example, a timing at which the content of the Configured NSSAI changes, a timing at which the tracking area, the registration area, and the RAN-based notification area are updated, or a timing at which a request for updating the Configured NSSAI is received from the UE 10.

The UE 10 that has acquired the updated Configured NSSAI executes the registration process of the PLMN in the network again, and acquires the Allowed NSSAI (step S502). Here, since the process after step S503 is similar to the process of FIG. 8, the description thereof will be omitted.

When the PDU session establishment request including the specific S-NSSAI is received from the UE 10, the AMF 301 of the PLMN may provide the UE 10 with the Equivalent PLMN list including the SNPN ID of the non-public network supporting the specific S-NSSAI to instruct the UE 10 to update the Equivalent PLMN list. Further, the AMF 301 of the PLMN may instruct to include the frequency corresponding to the SNPN ID of the non-public network included in the updated Equivalent PLMN list in the measurement frequency for cell selection or reselection, or to increase the priority of the frequency corresponding to the SNPN ID of the non-public network.

By reflecting the availability of the non-public network in the Configured NSSAI via the S-NSSAI by the above processing, it is possible to cause the UE 10 to perform updating in the granularity of the tracking arca, the registration area, the RAN-based notification area, and the like. The UE 10 can discover the cell of the (R)AN 20-2 in the non-public network even in the range of the service of the PLMN.

FIG. 10 is a diagram illustrating another example of a process for non-public network discovery. First, the process of step S501 and step S502 described in FIG. 8 is performed. Next, the UE 10 requests registration of any S-NSSAI included in the Configured NSSAI or included in the Requested NSSAI transmitted at the time of the registration process but not included in the Allowed NSSAI (step S507).

Since the S-NSSAI included in the Configured NSSAI matches the Subscribed S-NSSAI when the Configured NSSAI is configured in the UE 10, the S-NSSAI included in the Configured NSSAI and not included in the Allowed NSSAI or the S-NSSAI included in the Requested NSSAI and not included in the Allowed NSSAI corresponds to the S-NSSAI that the UE 10 has a contract to use in the registration arca but that cannot be supported by the PLMN. Here, the request for registration of S-NSSAI not included in the Allowed NSSAI may explicitly include information indicating an instruction to include a VPLMM or an SNPN other than the HPLMN in the object to be checked. Here, the S-NSSAI included in the Requested NSSAI and not included in the Allowed NSSAI is, for example, the Rejected S-NSSAI.

At the time of the registration process in step S502, when one or more pieces of S-NSSAI included in the Requested NSSAI received from the UE 10 includes S-NSSAI for which registration cannot be permitted in the registration area, the AMF 301 provides the UE 10 with one or more pieces of Rejected S-NSSAI for which the registration cannot be permitted, in addition to the Allowed NSSAI.

In providing the one or more Rejected S-NSSAI to the UE 10, the AMF 301 may provide a list including one or more tracking areas in which each Rejected S-NSSAI is unavailable in the registration area. Here, the registration area includes one or more tracking areas.

The UE 10 may request the AMF 301 to register Rejected S-NSSAI when moving from a tracking area where S-NSSAI is not available to another tracking area in the registration arca.

In addition, at the time of the registration process in step S502, in a case where there is S-NSSAI whose registration is not permitted in the registration area among the one or more pieces of S-NSSAI included in the Requested NSSAI received from the UE 10, and the one or more pieces of S-NSSAI can be used in one or more tracking areas of the registration area, the AMF 301 may provide the UE 10 with a set of the S-NSSAI and the available one or more tracking areas as the second Allowed NSSAI or the Conditionally Allowed NSSAI.

The UE 10 determines that the S-NSSAI included in the Allowed NSSAI is allowed to be used in all tracking areas of the registration area, and determines that the second Allowed NSSAI or the S-NSSAI included in the Conditionally Allowed NSSAI is allowed to be used only in the one or more tracking areas specified in the set.

For the second Allowed NSSAI or the one or more pieces of S-NSSAI included in the Conditionally Allowed NSSAI, when moving from the tracking area whose use is not permitted to any one of the one or more tracking areas specified in the set, the UE 10 may request the AMF 301 to register the one or more pieces of S-NSSAI.

When a request for registration of S-NSSAI included in the Configured NSSAI and not included in the Allowed NSSAI or S-NSSAI (for example, Rejected S-NSSAI) included in the Requested NSSAI and not included in the Allowed NSSAI is received from the UE 10, the AMF 301 of the HPLMN determines whether the VPLMN or the SNPN included in the Equivalent PLMN list supports the S-NSSAI whose registration is requested (step S508). Note that the HPLMN owns, for each VPLMN or SNPN, information pertaining to a correspondence relationship between S-NSSAI supported by the HPLMN and S-NSSAI supported by the VPLMN or the SNPN and a list including S-NSSAI of the VPLMN or the SNPN that can be used by the UE 10 of the HPLMN based on the roaming agreement with the VPLMN or the SLA with the SNPN. These are stored in the UDR. The AMF 301 of the HPLMN acquires these pieces of information from the UDR in accordance with the process of step S508.

In step S508, in a case where the VPLMN or the SNPN included in the Equivalent PLMN list supports the S-NSSAI whose registration is requested (step S508, Yes), the UE 10 acquires the updated Allowed NSSAI including the S-NSSAI whose registration is requested (step S509), and executes the processing in and after step S503.

On the other hand, in step S508, in a case where the VPLMN or the SNPN included in the Equivalent PLMN list does not support the S-NSSAI whose registration is requested (step S508, No), the registration of the requested S-NSSAI is rejected, and the UE 10 executes the processing in and after step S503. Here, since the processing after step S503 is similar to that in FIG. 8, the description thereof will be omitted.

By the above processing, it is possible to utilize a non-public network that can provide S-NSSAI in an area where specific S-NSSAI cannot be provided even within the service range of the PLMN. The UE 10 can discover the cell of the (R)AN 20-2 in the non-public network even within the service range of the PLMN.

As described above, when the subscriber of the public network uses the private network or the non-public network as necessary, it is possible to discover the cell of the base station device of the non-public network even within the service range of the public network.

In addition, since the measurement for discovering a non-public network can be limited to a specific condition (for example, in a case where the specific S-NSSAI is registered), the load of the measurement can be suppressed.

In addition, by reflecting the availability of the non-public network in the Configured NSSAI via the single network slice selection assistance information (S-NSSAI), it is possible to cause the user equipment (UE) to perform updating in granularity of a tracking area, a registration area, a RAN-based notification area, and the like.

In addition, a non-public network that can provide S-NSSAI can be utilized in an area where specific S-NSSAI cannot be provided even within a service range of a public network.

Further, by making a request for registration including an instruction to explicitly include a VPLMM or a SNPN other than the HPLMN in the object to be checked of S-NSSAI included in the Configured NSSAI and not included in the Allowed NSSAI, or S-NSSAI (for example, Rejected S-NSSAI) included in the Requested NSSAI and not included in the Allowed NSSAI, it is possible to utilize a public network or a nonpublic network of a roaming destination that can provide S-NSSAI in an area where a specific S-NSSAI cannot be provided even within a service range of a public network.

5. Establishment of PDU Session Utilizing Edge Application Server

When the PLMN has a service level agreement (SLA) with a company that manages and operates a non-public network, an edge application server of the non-public network can be utilized. In this case, improvement in delay characteristics at the time of data transmission can be expected.

Further, by utilizing roaming to make a non-public network a VPLMN, a PDU session can be established by the "distributed anchor point" of the connectivity model illustrated in FIG. 2 (see FIG. 6). In this case, all the processes required by the application are processed by the edge application server 40-2 of the non-public network. In this configuration, it is difficult to process data that is difficult to use outside a device managed by a service provider that provides a PLMN or an application. This is because a security problem occurs.

On the other hand, in a case where the processing is distributed between the application server 40-1 managed by the service provider providing the PLMN or the application and the edge application server 40-2 of the non-public network, it is necessary to establish the PDU session by the "multiple PDU sessions" of the connectivity model illustrated in FIG. 2. In this case, one PDU session is required to be established for a DN 340-1 connected with the application server 40-1, and another PDU session is required to be established for a DN 340-2 connected with the edge application server 40-2. In this way, it is not necessarily efficient to establish and manage multiple PDU sessions to process one application.

Therefore, a session management method for establishing a PDU session by the "session breakout" of the connectivity model illustrated in FIG. 2 is proposed.

5.1 First Embodiment

<Configuration of Network>

FIG. 11 is a diagram illustrating an example of a configuration for connecting to an edge application server of a VPLMN in PDU session establishment according to the first embodiment of the present disclosure. The UE 10 in the figure is assumed to be within the service range of the (R)AN 20-2 of a non-public network (that is, the SNPN or the VPLMN). The UE 10 transmits a PDU session establishment request including a data network name (DNN) of the DN 340-1 of the public network (that is, HPLMN) via the roaming destination (R)AN 20-2. Then, one PDU session is established between the DN 340-1 and the connected UPF 330-1 of the public network.

In the PDU session establishment process, when a C-SMF 306-1 determines that it is necessary to use the edge application server 40-2, a L-SMF 306-2 of the non-public network adds the UPF 330-21 that supports an uplink classifier (UL CL) or a branching point (BP) according to a request from the C-SMF 306-1. Thereby, a PDU session branched between the DN 340-2 of the non-public network and the connected UPF 330-22 in a local breakout (Local Breakout) technique is established.

Here, the local breakout is a method of causing the UE 10 to perform branching in the middle of one path (for example, a PDU session) with respect to the DN 340-1 so that a path with the edge application server 40-2 or a delay is minimized as much as possible. The local breakout can be implemented by adding a UPF 330-21 supporting an uplink classifier (UL CL) or a branching point (BP) to one PDU session with respect to the UPF 330-1.

By applying the local breakout, it is possible to add, to the PDU session, a function of distributing the transfer destination of the uplink data to the application server 40-1 and the edge application server 40-2. This distribution can be performed by the UPF 330-21 determining the type of uplink data. The method of determining the uplink data is configured by the C-SMF 306-1 via the L-SMF 306-2. The method of determining data may include, for example, a method of determining data according to required security.

Also, the L-SMF 306-2 can discover a candidate edge application servers 40-2 via an edge application server discovery function (EASDF) 311-2. The edge application server 40-2 is logically connected with the DN 340-2, and may be physically implemented in the same device operating as the DN 340-2. Furthermore, in one PDU session, one single network slice selection assistance information (S-NSSAI) and one DNN are associated, and thus the DNN same as the one for the DN 340-1 is configured for the DN 340-2.

The public network may implement a network data analytics function (NWDAF) and a data collection coordination function (DCCF) in the edge application server 40-2.

The network data analytics function can include an analytics logical function (AnLF) that executes inference using a learned artificial intelligence (AI)/machine learning (ML) model and generates analysis information, and a model training logical function (MTLF) that learns the AI/ML model. The learned AI/ML model can be acquired from another network data analytics function including the model training logical function according to the application to be used. Here, another network data analytics function is implemented in, for example, the application server 40-1. In addition to another network data analytics functions, another data collection coordination function is implemented in the application server 40-1.

Using various sensing information acquired from the UE 10 and the AI/ML model acquired according to the application, the network data analytics function implemented in the edge application server 40-2 performs image recognition, voice recognition, automatic translation, estimation of a two-dimensional or three-dimensional position, estimation of time for synchronization, calculation of advanced driver-assistance systems (ADAS) or assist information for assisting automatic driving, for example, generation of a layer of semi-static information, a layer of semi-dynamic information, and/or a layer of dynamic information constituting a dynamic map.

A vehicle equipped with the UE 10 is equipped with a global navigation satellite system (GNSS) receiver, an acceleration sensor, a gyro sensor, a camera (image sensor), a light detection and ranging (LiDAR), a millimeter wave radar, and the like, and can acquire assist information from the edge application server 40-2 to perform the ADAS or the automatic driving. The vehicle may further be equipped with an inertial measurement unit (IMU) including an acceleration sensor, a gyro sensor, a magnetic field sensor, an atmospheric pressure sensor, a temperature sensor, and the like. Here, the vehicle includes an unmanned aerial vehicle (UAV) represented by a drone (Drone).

Similarly, the robot on which the UE 10 is mounted is equipped with various sensors such as an inertial measurement unit, a voltage sensor, a current sensor, a time of flight (ToF) sensor, a camera (image sensor), an infrared sensor, an ultrasonic sensor, a pressure sensor, a vibration sensor, a humidity sensor, a gas sensor, and a taste sensor according to the application, and can acquire assist information from the edge application server 40-2 to autonomously move or operate in the factory.

Furthermore, the public network may implement a function of processing XR media such as an extended reality (XR) media generation unit and an XR media encoding unit in the edge application server 40-2.

The XR media generation unit generates the XR media adapted to the display region according to the adaptive media request received from the UE 10 that is the XR device.

The XR media encoding unit encodes XR media in an adaptive format. The adaptive format is controlled, for example, based on the communication quality of the radio section. When the communication quality is good, a higher resolution format is selected, and when the communication quality is not good, a lower resolution format is selected.

In addition, the UE 10 can improve stability of control with low delay by causing the edge application server 40-2 to process control of a closed loop (Closed loop) to be distributed in a cloud server (for example, the application server 40-1).

Each NF of the public network may exchange information with a NF of a non-public network via an NEF 302-2. Further, depending on the SLA between the public network and the non-public network, each NF of the public network may directly exchange information with the NF of the non-public network.

<Processing Method>

FIG. 12-14 is a diagram illustrating an example of a processing procedure according to the first embodiment of the present disclosure. The UE 10 discovers and selects the cell provided by the (R)AN 20-2 of the non-public network as the roaming destination according to the procedure of FIGS. 8 to 10 (step S661). Next, the UE 10 transmits a PDU session establishment request (PDU Session Establishment Request) message to an L-AMF 301-2 via the (R)AN 20-2 of the non-public network (step S662).

Next, the L-AMF 301-2 performs SMF selection based on the S-NSSAI, the DNN, and the like included in the PDU session establishment request message (step S663). This corresponds to a procedure of selecting the first session management function.

Next, the L-AMF 301-2 transmits a PDU session management context creation request (Nsmf_PDUSession_CreateSMContext_Request) message to the selected C-SMF 306-1 (step S664). Here, the L-AMF 301-2 may acquire information necessary for selection of the C-SMF 306-1, for example, a list including candidates for the C-SMF 306-1, via a C-NEF 302-1 of the public network.

When receiving the PDU session management context creation request message, the C-SMF 306-1 activates a process of acquiring information pertaining to the subscription contract for a UDM 307-1 (step S604).

The UDM 307-1 provides edge application server installation information (EAS Deployment Information) to the C-SMF 306-1 (step S605). The edge application server installation information is information indicating how the edge service is deployed for each locally installed DN (for example, the DN 340-2 of a non-public network).

The C-SMF 306-1 returns a response message (Nsmf_PDUSession_CreateSMContext_Response) to the PDU session management context creation request message (step S665).

An authentication and authorization (PDU Session authentication/authorization) process of the PDU session established between the UE 10 and the C-DN 340-1 is performed (step S607), and the C-SMF 306-1 performs PCF selection based on the S-NSSAI, the DNN, the information pertaining to the subscription contract, the edge application server installation information, and the like (step S608).

The C-SMF 306-1 performs a relationship establishment procedure (SM Policy Association Establishment procedure) of the session management policy with the selected PCF 305-1 (step S609). The acquisition of the edge application server installation information in step S605 may be performed in the relationship establishment procedure of the session management policy.

The C-SMF 306-1 performs edge application sever discovery function (EASDF) selection based on the subscription contract, the session management policy, the edge application server installation information about the VPLMN or the SNPN to be the roaming destination, and the like (step S611).

The C-SMF 306-1 transmits a DNS context creation request (Neasdf_DNSContext_Create Request) message to the selected L-EASDF 311-2 (step S612).

The L-EASDF 311-2 holds an IP address of the UE 10, a subscription permanent identifier (SUPI), a subscription concealed identifier (SUCI), or the like included in the message, and creates a DNS context. Then, the L-EASDF 311-2 returns a response message (Neasdf_DNSContext_Create Response) to the DNS context creation request message (step S613). After this processing, the C-SMF 306-1 includes the IP address of the L-EASDF 311-2 as the DNS server or the resolver in the PDU session establishment accept (PDU Session Establishment Accept) message to be transmitted to the UE 10.

The C-SMF 306-1 selects a UPF 330-1 to be a PDU session anchor (C-PSA) in the public network (step S614). This corresponds to a procedure of selecting the first user plane function.

The C-SMF 306-1 transmits an N4 session establishment request (N4 Session Establishment Request) message to the selected UPF (C-PSA) 330-1 (step S615). Through the N4 session establishment request message, an N4 rule for controlling uplink and downlink traffic in the UPF (C-PSA) 330-1 is configured. The N4 rule is information pertaining to, for example, a packet detection rule (PDR), a forwarding action rule (FAR), a QoS enforcement rule (QER), a usage reporting rule (URR), a buffering action rule (BAR), and the like.

Upon receiving the N4 session establishment request, the UPF (C-PSA) 330-1 configures the N4 rule and returns the N4 session establishment response (N4 Session Establishment Response) message to the C-SMF 306-1 (step S616). Note that, in a case where a plurality of UPFs 330-1 is selected for the PDU session in step S614 described above, the N4 session establishment process is activated for each UPF 330-1.

The C-SMF 306-1 transmits, to the L-AMF 301-2, a Namf_Communication_N1N2Message Transfer message including an N2 PDU session request (N2 PDU Session Request) message (step S666).

The L-AMF 301-2 transmits the N2 PDU session request message included in the Namf_Communication_N1N2Message Transfer message to the (R)AN 20-2 (Local), which is a base station device of a non-public network (step S667). The N2 PDU session request message includes a NAS message including a PDU session ID and an N1 session management container with the UE 10 as a destination, and N2 session management information pertaining to the (R)AN 20-2 (Local) transmitted from the C-SMF 306-1.

The (R)AN 20-2 (Local) acquires a PDU session ID, a QoS flow identifier (QFI), a QoS profile, and the like from the N2 session management information included in the N2 PDU session request message. In addition, the (R)AN 20-2 (Local) transfers the NAS message included in the N2 PDU session request message to the UE 10 (step S668). As described above, the NAS message includes the PDU session ID and the N1 session management container. The N1 session management container includes a QoS rule.

In addition, the (R)AN 20-2 (Local) allocates AN tunnel information (AN Tunnel Info) to the PDU session. Here, the AN tunnel information includes a tunnel endpoint of each (R)AN node involved and QFIs allocated to respective tunnel endpoints. The (R)AN 20-2 (Local) updates N2 session management information to be notified to the L-AMF 301-2. Here, the N2 session management information includes information such as a PDU session ID, AN tunnel information, a list of permitted or rejected QFI(s), and a User Plane Enforcement Policy Notification.

The (R)AN 20-2 (Local) returns an N2 PDU session response (N2 PDU Session Response) message to the L-AMF 301-2 as a response to the N2 PDU session request message (step S669).

The L-AMF 301-2 transmits a PDU session management context update request (Nsmf_PDUSession_UpdateSMContext Request) message to the C-SMF 306-1 (step S670).

The C-SMF 306-1 selects the edge application server 40-2 based on the information pertaining to the position of the UE 10, the edge application server installation information, and the like (step S637). Based on this selection result, the C-SMF 306-1 determines the Local DN 340-2 connected with the edge application server 40-2.

Subsequently, the C-SMF 306-1 selects a UPF that is connected to the edge application server 40-2 and serves as a PDU session anchor (L-PSA) in the non-public network based on the Local DN 340-2 (step S638). This corresponds to the procedure of selecting the second user plane function.

Further, the C-SMF 306-1 selects a UPF supporting the UL CL/BP (step S639).

The C-SMF 306-1 requests the SMF of the non-public network for an operation as the L-SMF 306-2 (step S640). The L-SMF 306-2 returns a response to the request for the operation as the L-SMF (Response for operation as L-SMF) to the C-SMF 306-1 (step S641).

The C-SMF 306-1 transmits an N4 session establishment request (N4 Session Establishment Request) message to the L-SMF 306-2 in order to request the establishment of an N4 session with the UPF (UL CL/BP) 330-21 and the UPF (L-PSA) 330-22 selected in step S638 and step S639 (step S642).

The L-SMF 306-2 transmits the N4 session establishment request (N4 Session Establishment Request) message to the UPF (UL CL/BP) 330-21 (step S643). Upon receiving the N4 session establishment request, the UPF (UL CL/BP) 330-21 configures the N4 rule and returns the N4 session establishment response (N4 Session Establishment Response) message to the L-SMF 306-2 (step S644).

The L-SMF 306-2 transmits the N4 session establishment request (N4 Session Establishment Request) message to the UPF (L-PSA) 330-22 (step S645). Upon receiving the N4 session establishment request, the UPF (L-PSA) 330-22 configures the N4 rule and returns the N4 session establishment response (N4 Session Establishment Response) message to the L-SMF 306-2 (step S646). Here, the N4 rule for the UPF (L-PSA) 330-22 includes an instruction to assign the data network name (DNN) same as the one for the C-DN 340-1 to the L-DN 340-2 to which the UPF (L-PSA) 330-22 is connected. In accordance with the instruction from the C-SMF 306-1, the UPF (L-PSA) 330-22 configures the DNN same as the one for the C-DN 340-1 for the L-DN 340-2. This corresponds to a procedure of associating the data network name.

Upon receiving the N4 session establishment response message from the UPF (UL CL/BP) 330-21 and the UPF (L-PSA) 330-22, the L-SMF 306-2 returns the N4 session establishment response (N4 Session Establishment Response) message to the C-SMF 306-1 (step S647).

The C-SMF 306-1 transmits an N4 session update request (N4 Session Modification Request) message to the UPF (C-PSA) 330-1 (step S648).

The UPF (C-PSA) 330-1 performs insertion of the UPF (UL CL/BP) 330-21 and reconfiguration of the N4 rule updated related to addition of a path locally broken out by the UPF (UL CL/BP) 330-21 and connected to the UPF (L-PSA) 330-22, and returns an N4 session update response (N4 Session Modification Response) message to the C-SMF 306-1 (step S649).

The C-SMF 306-1 returns a PDU session management context update response (Nsmf_PDUSession_UpdateSMContext Response) message to the L-AMF 301-2 (step S671). Here, the PDU session management context update response message includes the N2 message including the N2 session management information updated with the insertion of the UPF (UL CL/BP) 330-21 and the addition of the path locally broken out by the UPF (UL CL/BP) 330-21, the CN tunnel information (CN Tunnel Info), the S-NSSAI, and the N1 session management container.

The N1 session management container includes the PDU session establishment accept (PDU Session Establishment Accept) and the QoS rule that a C-AMF 301-1 must provide to the UE 10. The PDU session establishment accept includes the S-NSSAI and the IP address of EASDF 311-2.

The L-AMF 301-2 transmits an N2 message (N2 Message) included in the PDU session management context update response message to the (R)AN 20-2 (Local) (step S672).

The (R)AN 20-2 (Local) transmits the PDU session establishment accept and the QoS rule included in the N2 message to the UE 10 by using the N1 message (step S673), and returns a response to the N2 message (step S674).

In the above description, different network domains of the public network and the non-public network are classified by expressions of a central site (Central Site) and a local site (Local Site), but are not limited to this expression. For example, they may be classified by expressions of an HPLMN and a VPLMN with the public network as a home network and the non-public network as a visitor network. In addition, the VPLMN may be classified as a SNPN.

By the procedure of steps S642 to S649 described above, the C-SMF 306-1 can add, to the PDU session, a function of distributing, based on the uplink data, the transfer destination of the data to the application server 40-1 via the first user plane function described above and the edge application server 40-2 via the second user plane function described above.

The configuration of the network architecture illustrated in FIG. 11 can be implemented by the PDU session establishment process including the edge application server described above.

In this way, the session management method of the first embodiment of the present disclosure includes establishing a PDU session between the UE 10 and the DN 340-1, and connecting with the DN 340-2 including an edge application server in a form of a session breakout within the PDU session. It is connected to the DN 340-2 via a local site in the form of roaming. Since there is one PDU session to manage, session management can be facilitated as compared with a case where two PDU sessions are established.

5.2 Second Embodiment

An example in which the network configuration including the public network and the non-public network illustrated in FIG. 7 is applied will be described. Specifically, in addition to the (R)AN 20-1 of a public network that operates as a master node (MN), the (R)AN 20-2 of a non-public network that provides a service using an edge application server is configured as a secondary node (SN), and a radio bearer by dual connectivity (DC) is constructed for the UE 10.

<Configuration of Network>

FIG. 15 is a diagram illustrating an example of a configuration connected to an edge application server of a VPLMN in PDU session establishment according to the second embodiment of the present disclosure. The UE 10 in the figure is assumed to be within the service range of the (R)AN 20-2 of a non-public network (that is, the SNPN or the VPLMN). When this UE 10 transmits, via the (R)AN 20-1 of the public network, a PDU session establishment request including the DNN of the DN 340-1 of the public network, one PDU session is established between the DN 340-1 and the connected UPF 330-1 of the public network.

In the PDU session establishment process, when the C-SMF 306-1 determines that it is necessary to use the edge application server 40-2 and the UE 10 is within the service range of the (R)AN 20-2 of the non-public network that provides the service using the edge application server 40-2, the UE 10 establishes the radio bearer by the DC with the (R)AN 20-1 of the public network as the MN and the (R)AN 20-2 of the non-public network as the SN. When the radio bearer by the DC is established, the L-SMF 306-2 of the non-public network adds the UPF 330-21 supporting UL CL or the BP based on a request from the C-SMF 306-1, and establishes a PDU session branched between the DN 340-2 of the non-public network and the connected UPF 330-22 in a local breakout technique.

Here, the local breakout is a method of causing the UE 10 to perform branching in the middle of one path (for example, a PDU session) with respect to the DN 340-1 so that a path with the edge application server 40-2 or a delay is minimized as much as possible. The local breakout can be implemented by adding a UPF 330-21 supporting an uplink classifier (UL CL) or a branching point (BP) to one PDU session with respect to the UPF 330-1.

The L-SMF 306-2 may discover the candidate edge application server 40-2 via the EASDF 311-2. The edge application server 40-2 is logically connected with the DN 340-2, and may be physically implemented in the same device operating as the DN 340-2. In addition, since one S-NSSAI and one DNN are associated in one PDU session, the DNN same as the one for the DN 340-2 is configured for the DN 340-1.

The public network may implement a network data analytics function (NWDAF) and a data collection coordination function (DCCF) in the edge application server 40-2.

The network data analytics function can include an analytics logical function (AnLF) that executes inference using a learned artificial intelligence (AI)/machine learning (ML) model and generates analysis information, and a model training logical function (MTLF) that learns the AI/ML model. According to the application to be used, the learned ML model can be acquired from another network data analytics function including the model training logical function. Here, another network data analytics function is implemented in, for example, the application server 40-1. In addition to another network data analytics functions, another data collection coordination function is implemented in the application server 40-1.

Using various sensing information acquired from the UE 10 and the AI/ML model acquired according to the application, the network data analytics function implemented in the edge application server 40-2 performs image recognition, voice recognition, automatic translation, estimation of a two-dimensional or three-dimensional position, estimation of time for synchronization, calculation of advanced driver-assistance systems (ADAS) or assist information for assisting automatic driving, for example, generation of a layer of semi-static information, a layer of semi-dynamic information, and/or a layer of dynamic information constituting a dynamic map.

A vehicle equipped with the UE 10 is equipped with a global navigation satellite system (GNSS) receiver, an acceleration sensor, a gyro sensor, a camera (image sensor), a light detection and ranging (LiDAR), a millimeter wave radar, and the like, and can acquire assist information from the edge application server 40-2 to perform the ADAS or the automatic driving. The vehicle may further be equipped with an inertial measurement unit (IMU) including an acceleration sensor, a gyro sensor, a magnetic field sensor, an atmospheric pressure sensor, a temperature sensor, and the like. Here, the vehicle includes an unmanned aerial vehicle (UAV) represented by a drone (Drone).

Similarly, the robot on which the UE 10 is mounted is equipped with various sensors such as an inertial measurement unit, a voltage sensor, a current sensor, a time of flight (ToF) sensor, a camera (image sensor), an infrared sensor, an ultrasonic sensor, a pressure sensor, a vibration sensor, a humidity sensor, a gas sensor, and a taste sensor according to the application, and can acquire assist information from the edge application server 40-2 to autonomously move or operate in the factory.

Furthermore, the public network may implement a function of processing XR media such as an extended reality (XR) media generation unit and an XR media encoding unit in the edge application server 40-2.

The XR media generation unit generates the XR media adapted to the display region according to the adaptive media request received from the UE 10 that is the XR device.

The XR media encoding unit encodes XR media in an adaptive format. The adaptive format is controlled, for example, based on the communication quality of the radio section. When the communication quality is good, a higher resolution format is selected, and when the communication quality is not good, a lower resolution format is selected.

In addition, the UE 10 can improve stability of control with low delay by causing the edge application server 40-2 to process control of a closed loop (Closed loop) to be distributed in a cloud server (for example, the application server 40-1).

Each NF of the public network may exchange information with a NF of a non-public network via the NEF 302-2. Further, depending on the SLA between the public network and the non-public network, each NF of the public network may directly exchange information with the NF of the non-public network.

<Processing Method>

FIG. 16-19 is a diagram illustrating an example of a processing procedure according to the second embodiment of the present disclosure. The UE 10 transmits a PDU session establishment request (PDU Session Establishment Request) message to the C-AMF 301-1 via the (R)AN 20-1 (MN) which is a base station device of a public network (step S601).

The C-AMF 301-1 performs SMF selection based on S-NSSAI, DNN, and the like included in the PDU session establishment request message (step S602) to transmit a PDU session management context creation request (Nsmf_PDUSession_CreateSMContext_Request) message to the selected C-SMF 306-1 (step S603).

When receiving the PDU session management context creation request message, the C-SMF 306-1 activates a process of acquiring information pertaining to the subscription contract for the UDM 307-1 (step S604).

The UDM 307-1 provides edge application server installation information (EAS Deployment Information) to the C-SMF 306-1 (step S605). The edge application server installation information is information indicating how the edge service is deployed for each locally installed DN (for example, the DN 340-2 of a non-public network).

The C-SMF 306-1 returns a response message (Nsmf_PDUSession_CreateSMContext_Response) to the PDU session management context creation request message (step S606).

An authentication and authorization (PDU Session authentication/authorization) process of the PDU session established between the UE 10 and the C-DN 340-1 is performed (step S607).

The C-SMF 306-1 performs PCF selection based on the S-NSSAI, the DNN, the information pertaining to the subscription contract, the edge application server installation information, and the like (step S608).

The C-SMF 306-1 performs a relationship establishment procedure (SM Policy Association Establishment procedure) of the session management policy with the selected PCF 305-1 (step S609). The acquisition of the edge application server installation information in step S605 may be performed in the relationship establishment procedure of the session management policy.

The C-SMF 306-1 selects a VPLMN or SNPN candidate to be a non-public network that provides a service using the edge application server based on the information pertaining to the position of the UE 10, the edge application server installation information, and the like (step S610). Here, the information pertaining to the position of the UE 10 may be acquired from the UE 10 or may be acquired from a location management function (LMF) 312.

The C-SMF 306-1 performs edge application server discovery function (EASDF) selection based on the subscription contract, the selected VPLMN or SNPN candidate, the session management policy, the edge application server installation information, and the like (step S611).

The C-SMF 306-1 transmits a DNS context creation request (Neasdf_DNSContext_Create Request) message to the selected L-EASDF 311-2 (step S612).

The L-EASDF 311-2 holds an IP address of the UE 10, a subscription permanent identifier (SUPI), a subscription concealed identifier (SUCI), or the like included in the message, and creates a DNS context. Then, the L-EASDF 311-2 returns a response message (Neasdf_DNSContext_Create Response) to the DNS context creation request message (step S613).

After this processing, the C-SMF 306-1 includes the IP address of the L-EASDF 311-2 as the DNS server or the resolver in the PDU session establishment accept (PDU Session Establishment Accept) message to be transmitted to the UE 10.

The C-SMF 306-1 selects a UPF 330-1 to be a PDU session anchor (C-PSA) in the public network (step S614). Next, the C-SMF 306-1 transmits an N4 session establishment request (N4 Session Establishment Request) message to the selected UPF (C-PSA) 330-1 (step S615). Through the N4 session establishment request message, an N4 rule for controlling uplink and downlink traffic in the UPF (C-PSA) 330-1 is configured. The N4 rule is information pertaining to, for example, a packet detection rule (PDR), a forwarding action rule (FAR), a QoS enforcement rule (QER), a usage reporting rule (URR), a buffering action rule (BAR), and the like.

Upon receiving the N4 session establishment request, the UPF (C-PSA) 330-1 configures the N4 rule and returns the N4 session establishment response (N4 Session Establishment Response) message to the C-SMF 306-1 (step S616). Note that, in a case where a plurality of UPFs 330-1 is selected for the PDU session in step S614 described above, the N4 session establishment process is activated for each UPF 330-1.

The C-SMF 306-1 transmits a Namf_Communication_N1N2MessageTransfer message to the C-AMF 301-1 (step S617). The Namf_Communication_N1N2Message Transfer message includes a PDU session ID, N2 session management information (N2 SM Information), CN tunnel information (CN Tunnel Info), S-NSSAI, and an N1 session management container (N1 SM Container).

The C-AMF 301-1 transmits an N2 PDU session request (N2 PDU Session Request) message to the (R)AN 20-1 (MN), which is a base station device of the public network (step S618).

The (R)AN 20-1 (MN) transmits an RRC reconfiguration (RRCReconfiguration) message to the UE 10, and updates the RRC related configuration of the UE 10 (step S619). Here, the (R)AN 20-1 (MN) makes a notification of an instruction to add a frequency band corresponding to the VPLMN or SNPN candidate selected in step S613 to the measurement frequency band of the UE 10 by using the RRC reconfiguration message. The instruction to add the frequency band corresponding to the VPLMN or SNPN candidate is notified from the C-SMF 306-1 to the (R)AN 20-1 (MN) by using the N2 session management information described above.

When updating the configuration related to the RRC, the UE 10 returns an RRC reconfiguration complete (RRCReconfigurationComplete) message to the (R)AN 20-1 (MN) as a response to the RRC reconfiguration message (step S620).

The (R)AN 20-1 (MN) returns an N2 PDU session response (N2 PDU Session Response) message to the C-AMF 301-1 as a response to the N2 PDU session request message (step S621).

The UE 10 performs the measurement on the frequency band corresponding to the VPLMN or SNPN candidate in addition to the frequency band corresponding to the PLMN (step S622). Next, the UE 10 transmits a measurement report (Measurement reporting) to the (R)AN 20-1 (MN) based on the condition for the measurement report (Measurement Report) configured by using the RRC reconfiguration message (step S623).

Based on the measurement report received from the UE 10, the (R)AN 20-1 (MN) determines to add the (R)AN 20-2, which is a base station device of a non-public network, as a secondary node (SN) of dual connectivity (DC) (step S624). Next, the (R)AN 20-1 (MN) notifies the C-AMF 301-1 of information pertaining to the VPLMN or the SNPN corresponding to the selected non-public network (Provision of information on selected VPLMN/SNPN) (step S625).

Upon receiving the information pertaining to the VPLMN or the SNPN corresponding to the selected non-public network, the C-AMF 301-1 requests the AMF of the non-public network to operate as the L-AMF 301-2 (Request for operation as L-AMF) (step S626). Here, the C-AMF 301-1 can identify the AMF operating as the L-AMF 301-2 by making a request of the NEF 302-2 of the non-public network for the AMF that controls the (R)AN 20-2 of the non-public network.

The L-AMF 301-2 returns a response to the request to operate as the L-AMF (Response for operation as L-AMF) to the C-AMF 301-1 (step S627).

The (R)AN 20-1 (MN), which is a base station device of a public network, transmits an SN addition request (SN Addition Request) message to the (R)AN 20-2, which is a base station device of a non-public network (step S628). Upon receiving the SN addition request, the (R)AN 20-2 returns a response (SN Addition Request Acknowledge) message to the SN addition request to the (R)AN 20-1 (MN) (step S629).

After receiving the response message to the SN addition request, the (R)AN 20-1 (MN) transmits an RRC reconfiguration message (RRCReconfiguration) instructing the SN addition to the UE 10 (step S630). When completing the configuration necessary for the SN addition, the UE 10 responds an RRC reconfiguration complete (RRCReconfigurationComplete) message to the (R)AN 20-1 (MN) (step S631). The (R)AN 20-1 (MN) transfers the SN reconfiguration complete (RRCReconfigurationComplete) message to the (R)AN 20-2 in order to make a notification that the UE 10 has completed the configuration necessary for the SN addition (step S632).

The UE 10 performs a random access procedure (Random Access Procedure) on the (R)AN 20-2 which is an SN (step S633). As a result, the (R)AN 20-2 establishes a radio bearer for the DC with the UE 10 and notifies the L-AMF 301-2 of a PDU session modification indication (PDU Session Modification Indication) (step S634).

The L-AMF 301-2 transmits a PDU session management context update request (Nsmf_PDUSession_UpdateSMContext Request) message to the C-SMF 306-1 via the C-AMF 301-1 (step S635, step S636).

The C-SMF 306-1 selects the edge application server 40-2 based on the information pertaining to the position of the UE 10, the edge application server installation information, and the like (step S637). Next, the C-SMF 306-1 determines the Local DN 340-2 connected with the edge application server 40-2. Subsequently, the C-SMF 306-1 selects a UPF that is connected to the edge application server 40-2 and serves as a PDU session anchor (L-PSA) in the non-public network based on the Local DN 340-2 (step S638). Further, the C-SMF 306-1 selects a UPF supporting the UL CL/BP (step S639).

The C-SMF 306-1 requests the SMF of the non-public network to operate as the L-SMF 306-2 (Request for operation as L-SMF) (step S640). The L-SMF 306-2 returns a response to the request for the operation as the L-SMF (Response for operation as L-SMF) to the C-SMF 306-1 (step S641).

The C-SMF 306-1 transmits an N4 session establishment request (N4 Session Establishment Request) message to the L-SMF 306-2 in order to request the establishment of an N4 session with the UPF (UL CL/BP) 330-21 and the UPF (L-PSA) 330-22 selected in step S638 and step S639 (step S642).

The L-SMF 306-2 transmits the N4 session establishment request (N4 Session Establishment Request) message to the UPF (UL CL/BP) 330-21 (step S643). The UPF (UL CL/BP) 330-21 that has received the N4 session establishment request configures the N4 rule. Next, the UPF (UL CL/BP) 330-21 returns the N4 session establishment response (N4 Session Establishment Response) message to the L-SMF 306-2 (step S644).

The L-SMF 306-2 transmits the N4 session establishment request (N4 Session Establishment Request) message to the UPF (L-PSA) 330-22 (step S645). Upon receiving the N4 session establishment request, the UPF (L-PSA) 330-22 configures the N4 rule. Next, the UPF (L-PSA) 330-22 returns the N4 session establishment response (N4 Session Establishment Response) message to the L-SMF 306-2 (step S646).

Here, the N4 rule for the UPF (L-PSA) 330-22 includes an instruction to assign the data network name (DNN) same as the one for the C-DN 340-1 to the L-DN 340-2 to which the UPF (L-PSA) 330-22 is connected. Based on the instruction from the C-SMF 306-1, the UPF (L-PSA) 330-22 configures the DNN same as the one for the C-DN 340-1 for the L-DN 340-2.

Upon receiving the N4 session establishment response message from the UPF (UL CL/BP) 330-21 and the UPF (L-PSA) 330-22, the L-SMF 306-2 returns the N4 session establishment response (N4 Session Establishment Response) message to the C-SMF 306-1 (step S647).

The C-SMF 306-1 transmits an N4 session update request (N4 Session Modification Request) message to the UPF (C-PSA) 330-1 (step S648).

The UPF (C-PSA) 330-1 performs insertion of the UPF (UL CL/BP) 330-21 and reconfiguration of the N4 rule updated in association with the addition of a path locally broken out at the UPF (UL CL/BP) 330-21 and connected to the UPF (L-PSA) 330-22. Next, the UPF (C-PSA) 330-1 returns an N4 session update response (N4 Session Modification Response) message to the C-SMF 306-1 (step S649).

The C-SMF 306-1 returns a PDU session management context update response (Nsmf_PDUSession_UpdateSM-Context Response) message to the L-AMF 301-2 via the C-AMF 301-1 (step S650, step S651).

The L-AMF 301-2 transmits an N2 PDU session request (N2 PDU Session Request) message to the (R)AN 20-2 (SN) which is a base station device of a non-public network (step S652). The N2 PDU session request message includes N2 session management information pertaining to the (R)AN 20-2 (SN) transmitted from the C-SMF 306-1.

The (R)AN 20-2 (SN) returns an N2 PDU session response (N2 PDU Session Response) message to the L-AMF 301-2 (step S653).

The C-AMF 301-1 transmits, to the (R)AN 20-1 (MN), the N2 message (N2 Message) including the N2 session management information updated with the insertion of the UPF (UL CL/BP) 330-21 and the addition of the path to be locally broken out by the UPF (UL CL/BP) 330-21, the CN tunnel information (CN Tunnel Info), the S-NSSAI, and the N1 session management container (step S654).

The N1 session management container includes the PDU session establishment accept (PDU Session Establishment Accept) and the QoS rule that the C-AMF 301-1 must provide to the UE 10. The PDU session establishment accept includes the S-NSSAI and the IP address of the EASDF 311-2.

The (R)AN 20-1 (MN) transmits the PDU session establishment accept included in the N2 message and the QoS rule to the UE 10 by using the N1 message (N1 Message) (step S655), and returns a response to the N2 message (step S656).

In the above description, different network domains of the public network and the non-public network are classified by expressions of a central site (Central Site) and a local site (Local Site), but the present invention is not limited to this expression. For example, they may be classified by expressions of an HPLMN and a VPLMN with the public network as a home network and the non-public network as a visitor network. In addition, the VPLMN may be classified as a SNPN.

By the procedure of steps S642 to S649 described above, the C-SMF 306-1 can add, to the PDU session, a function of distributing, based on the uplink data, the transfer destination of the data to the application server 40-1 via the first user plane function described above and the edge application server 40-2 via the second user plane function described above. The distributing function is a function of performing distribution between transfer of the first traffic mapped to the first radio bearer via the master node to the application server via the first user plane function and transfer of the second traffic mapped to the second radio bearer via the secondary node to the edge application server via the second user plane function.

Note that the (R)AN 20-1 in the home network corresponds to the master node, and the (R)AN 20-2 in the visitor network corresponds to the secondary node. The (R)AN 20-1 is an example of a first base station. The (R)AN 20-2 is an example of a second base station. In addition, the transmission path via the (R)AN 20-1 is an example of a first radio bearer. The transmission path via the (R)AN 20-2 is an example of a second radio bearer. In addition, the UPF 330-1 is an example of a first user plane function. The UPF 330-22 is an example of a second user plane function.

The configuration of the network architecture illustrated in FIG. 15 can be implemented by the PDU session establishment process including the edge application server described above.

As described above, the session management method according to the second embodiment of the present disclosure include being connected to the (R)AN 20-1 as a secondary node while being connected to (R)AN 20-2 as a master node. The secondary node is connected to the DN 340-2 including the edge application server in the form of a session breakout. Since there is one PDU session to manage, session management can be facilitated as compared with a case where two PDU sessions are established.

5.3 Summary

According to the first embodiment and the second embodiment described above, it is possible to realize session management in which a public network easily manages to utilize an edge application server provided by a non-public network. This makes it possible to reduce the delay in the user plane.

5.4 Supplementary Description

Terms of the above-described embodiments will be described.

<Edge Application Server Information>

As described in step S605 of FIG. 16, the edge application server installation information is information indicating how the edge service is deployed for each DN locally installed.

Here, an AF 308-2 of the non-public network can request NEF 302-1 to generate, update, and delete the edge application server installation information by using an edge application server installation information generation, update, and deletion (Nnef_EASDeployment_Create/Update/Delete) service according to a policy of the public network. When the public network policy allows the request from the AF 308-2, the NEF 302-1 activates the data management generation, update, and deletion (Nudr_DM-_Create/Update/Delete) service for the UDR, and the UDR stores information related to the installation of the edge application server included in the request from AF 308-2.

In addition, the edge application server installation information includes a DNN, an S-NSSAI, a group identifier, an application ID, an absolute domain name (fully qualified domain name (FQDN)), DNS server information, IP address information (EAS IP address range Information), and the like.

The group identifier includes an internal group identifier (Internal Group Identifier) and an external group identifier (External Group Identifier). The NEF 302-1 may map the external group identifiers provided by the AF 308-2 to internal group identifiers based on information received from the UDM 307-1. The UDR contract information about the UE 10 may be information in which the contractor of the UE 10 and the group identified by the internal group identifier are associated. That is, the edge application server installation information for each different internal group identifier can be created for the same DNN and S-NSSAI.

<Policy Related to Session Management>

As described in step S609 in FIG. 16, the C-SMF 306-1 performs a relationship establishment procedure of the session management policy with the selected PCF 305-1.

The policy related to session management acquired by the C-SMF 306-1 includes, for example, information recommending use of an edge application server for a PDU session identified by the S-NSSAI and the DNN. A PLMN which is a public network that provides an application via the DNN or a third-party service provider, may request, via an AF request, the application to reflect the presence or absence of an edge application server use recommendation in a session management policy.

The presence or absence of the edge application server use recommendation is configured for each information (Application Identifier) for identifying the application. The request for reflecting the presence or absence of the edge application server use recommendation in the policy related to session management can be included in, for example, an N6 traffic routing request for each data network access identifier (DNAI) described later. In this case, a request for reflecting the presence or absence of the edge application server use recommendation in a policy related to session management may be provided as N6 traffic routing information.

Note that the AF 308 can make a request related to routing of traffic to the application server 40 using the AF request. This AF request is transmitted to the PCF 305 via the NEF 302. Note that, in a case where the AF 308 can directly access the PCF 305, the AF request is transmitted to the PCF 305 via the N5 of the reference point. The N5 is a reference point defined between the AF 308 and the PCF 305. The PCF 305 translates the received AF request into a policy or a rule that is applied to the PDU session.

The AF request must include a Traffic Description, a Target UE Identifier(s), and an AF Transaction Identifier that are mandatory. Here, the Traffic Description is information for identifying traffic, and includes a combination of a data network name (DNN) and single network slice selection assist information (S-NSSAI), and an application identifier or traffic filtering information. Here, the DNN corresponds to an access point name (APN) used in a system prior to the 4G.

Furthermore, the S-NSSAI is information (network slice selection assistance information) for assisting selection of a network slice. The S-NSSAI includes a set of mandatory slice/service type (SST) with 8 bits for identifying a slice type and optional slice differentiator (SD) with 24 bits for distinguishing different slices in the same SST.

The application identifier is information for identifying an application that handles the traffic of the user plane, and is information used by the UPF 330 to identify the traffic of the application.

The traffic filtering information is information for classifying traffic. For example, it is 5 Tuples including a source IP, a source port number, a destination IP, a destination port number, and a protocol number.

In addition, the AF request can include information pertaining to the position of a potential application depending on conditions. Here, the information pertaining to the position of the potential application is provided as a list including a data network access identifier (DNAI) for identifying user plane access to one or more DNs 340 that are candidates of a destination where the application is implemented.

Further, the AF request may optionally include a Spatial Validity Condition, an N6 traffic routing requirement, an Application Relocation Possibility, a UE IP address preservation indication, a Temporary Validity Condition, information about AF subscription to an SMF event, information for IP Replacement of an edge application server in the 5GC 30, a User Plane Latency Requirement, information about AF change, an instruction for edge application server relocation (EAS Relocation), and the like. Here, the N6 is a reference point between the UPF 330 and the DN 340.

The Spatial Validity Condition is provided in the form of a valid area. In a case where the AF request is a request related to determination of routing in the SMF 306, the Spatial Validity Condition indicates that the routing of the traffic is applied only to the traffic of the UE 10 located in a specific location. In a case where the AF request is a request for registering a notification of an event of path management of the user plane, the Spatial Validity Condition indicates that the notification is applied only to traffic of the UE 10 located at a specific location.

The information about the N6 traffic routing request is information provided for each DNAI, and may include a routing profile ID and N6 traffic routing information. The routing profile ID is identification information for referring to a policy related to routing agreed in advance between the AF 308 and the 5GC 30. The N6 traffic routing information includes information necessary for forwarding traffic to the DNAI.

The Application Relocation Possibility is information indicating whether an application can be relocated after the position of the application is selected by the 5GC 30.

The UE IP address preservation indication indicates that the IP address of the UE 10 related to the traffic identified by the Traffic Description should be maintained. When this instruction is received from the AF 308, the 5GC 30 maintains the IP address of the UE 10 by avoiding reselection of the UPF 330 after the UPF 330 is selected.

The Temporary Validity Condition is provided in a format indicating a time interval or a period in which the AF request is applied. When the AF request is a request related to determination of routing in the SMF 306, the Temporary Validity Condition indicates when routing of the traffic is applied. In a case where the AF request is a request for registering a notification of a user plane path management event, the Temporary Validity Condition indicates when the notification will occur.

The AF request including information about AF subscription to the SMF event is a request for registering a notification of a change in the user plane path associated with the traffic identified by the Traffic Description. The AF request includes a subscription type, a notification target address for receiving an event notification, and the like. When the type of subscription is an early notification (Early notification), the SMF 306 transmits a notification of a path change before a new user plane path is configured. When the type of subscription is late notification (Late notification), the SMF 306 transmits a notification of a path change after a new user plane path is configured.

The information for IP replacement of the edge application server indicates an identifier of a source edge application server and an identifier of a target edge application server for a service by edge computing. Here, the identifier is, for example, an IP address and a port number of the source and target edge application servers.

The User Plane Latency Requirement is a delay on the user plane that is considered when the target edge application server is relocated. In a network deployment in which an estimate of the delay in the user plane between the UE 10 and the candidate PSA UPF is known to the SMF 306, the AF 308 may request a User Plane Latency Requirement from the 5GC 30 via the AF request so that the SMF 306 can determine a relocation of the PSA UPF based on the AF request.

The information about the AF change is information about the relocation of the AF 308, and includes an AF ID which is information for identifying the target AF 308 of the change destination.

The instruction for relocating the edge application server is an instruction for relocating the application.

<Information Pertaining to Position of UE 10>

As described in step S610 in FIG. 16, the C-SMF 306-1 selects a VPLMN or SNPN candidate to be the non-public network that provides the service using the edge application server based on the information pertaining to the position of the UE 10 and the like.

In the UE-Based mode, the UE 10 can acquire assistance data from a location management function (LMF) and perform measurement and calculation of a location related to a global navigation satellite system (GNSS). For example, a widely known technique called Assisted-GNSS can be used. Note that, for example, in a case where a signal from the GNSS cannot be received, the UE 10 may detect the information pertaining to the position by means other than the GNSS. For example, the UE 10 can detect information pertaining to its own position using a technique called sidelink positioning, WLAN positioning, Bluetooth (registered trademark) positioning, or terrestrial beacon systems (TBS) positioning.

In the sidelink positioning, the UE 10 measures a sidelink received signal strength indicator (SL RSSI) by the sidelink communication with the surrounding UE 10 or a road side unit (RSU), and calculates the position based on the information pertaining to the position of each UE 10 or road side unit and the measured value of the SL RSSI. Furthermore, the UE 10 may measure a round trip time (RTT) with the surrounding UE 10 or a road side unit and calculate the position thereof.

In the WLAN positioning, the UE 10 measures a received signal strength indicator (RSSI) for each WLAN access point, and calculates the position based on the information on the known coordinates of each WLAN access point and the measured value of thereof. Further, the UE 10 may measure a round trip time (RTT) with the WLAN access point and calculate the position thereof.

In the Bluetooth positioning, the UE 10 may measure a received signal strength indicator (RSSI) for each Bluetooth beacon and calculate the position based on information about known coordinates of each Bluetooth beacon and the measured value thereof.

In a case where the UE 10 is equipped with a GNSS receiver, in the UE-Assisted mode, the UE 10 performs measurements regarding the GNSS, such as Code Phase, Doppler, and Carrier Phase to transmit these measured values to the LMF 312, and the LMF 312 calculates the position of the UE 10.

In addition, when the UE 10 cannot receive a signal from the GNSS even when the UE is equipped with the GNSS receiver, or is not equipped with the GNSS, the LMF 312 may acquire information pertaining to the position of the UE 10 by a positioning technique called observed time difference of arrival (OTDOA), round trip time (Multi-RTT), downlink angle-of-departure (DL AoD), downlink time difference of arrival (DL TDOA), uplink time difference of arrival (UL TDOA), or angle of arrival (UL AoA), or a positioning technique using a cell ID (CID).

For example, in the OTDOA, the UE 10 receives a downlink positioning reference signal (PRS) from a plurality of transmission points (TPs), and reports measured values regarding the physical cell ID, the global cell ID, the TP ID, and the PRS timing to the LMF 312 via an LTE positioning protocol (LPP), so that the LMF 312 calculates the position of the UE 10 based on information about known coordinates of each measured TP and the reported relative timing of the PRS.

Furthermore, for example, in positioning using the CID, the LMF 312 calculates the position of the UE 10 based on information about known coordinates of the ng-eNB or the gNB and the following measurement results reported from the UE 10. The UE 10 reports, for example, an evolved cell global identifier (ECGI) or a physical cell ID, and measurement results regarding reference signal received power (RSRP), reference signal received quality (RSRQ), and UE Rx-Tx time difference to the LMF 312. Here, the UE Rx-Tx time difference is defined as a time difference between a timing at which the UE 10 receives and a timing at which the UE transmits.

<N4 Rule>

In step S615 of FIG. 17, the UPF (C-PSA) 330-1 configures the N4 rule. As described above, the N4 rule is information pertaining to, for example, a packet detection rule (PDR), a forwarding action rule (FAR), a QoS enforcement rule (QER), a usage reporting rule (URR), a buffering action rule (BAR), and the like.

The PDR includes information necessary for classifying a packet in the UPF 330. For example, the information required to classify the packet is configured according to a policy or a rule related to the number of QoS flows to be mapped to one PDU session corresponding to the application ID acquired from the PCF 305 and a policy or a rule for mapping a 5 QI or QoS feature to each QoS flow. The UPF 330 may classify packets of a PDU session by the QFI corresponding to the 5 QI or QoS feature. Here, the policy or rule related to the number of QoS flows is configured based on, for example, the N6 traffic routing information acquired by the PCF 305 as part of the AF request. Here, the number of QoS flows to be mapped to one PDU session may be explicitly included as a parameter of the AF request, or may be configured based on the number of connection destinations of the N6 traffic routing information.

The FAR includes information pertaining to a processing method for a specific packet, for example, forward, duplication, drop, buffer, or the like.

QER includes information pertaining to an indication of QoS applied to traffic. For example, the information pertaining to the QoS indication applied to the traffic is configured according to a policy or rule for mapping a 5 QI or QoS feature to each QoS flow acquired from the PCF 305.

The URR includes information necessary for traffic measurement and reporting. The BAR includes a period and an amount of data to be buffered, and information pertaining to a notification method in the control plane.

<Namf_Communication_N1N2MessageTransfer Message>

As described in step S617 in FIG. 17, the C-SMF 306-1 transmits a Namf_Communication_N1N2Message Transfer message to the C-AMF 301-1. As described above, the Namf_Communication_N1N2MessageTransfer message includes a PDU session ID, N2 session management information (N2 SM Information), CN tunnel information (CN Tunnel Info), S-NSSAI, and an N1 session management container (N1 SM Container).

The N2 session management information includes a PDU session ID, QFI(s), a QoS profile, and the like. Here, the QoS profile may include information pertaining to the PDU set. For example, information pertaining to the PDU set configured in a QoS flow corresponding to a specific QFI is included. In addition, in a case where a plurality of QoS flows is mapped to one PDU session, a QoS profile set including a plurality of QoS profiles may be provided.

When a plurality of UPFs 330-1 is used for the PDU session, the CN tunnel information includes tunneling information (Tunnel Information) related to the plurality of UPFs 330-1 terminating the N3.

The N1 session management container includes the QoS rule that the C-AMF 301-1 must provide to the UE 10.

The Namf_Communication_N1N2MessageTransfer message includes a PDU session ID so that the C-AMF 301-1 recognizes which access to use for the UE 10.

<N2 PDU Session Request Message>

As described in step S618 of FIG. 17, the C-AMF 301-1 transmits the N2 PDU session request message to the (R)AN 20-1 (MN), which is a base station device of the public network. The N2 PDU session request message includes a NAS message including a PDU session ID and an N1 session management container with the UE 10 as a destination, and N2 session management information pertaining to the (R)AN 20-1 (MN) transmitted from the C-SMF 306-1.

The (R)AN 20-1 (MN) acquires the PDU session ID, the QFI, the QoS profile, and the like from the N2 session management information included in the N2 PDU session request message. In addition, the (R)AN 20-1 (MN) transfers the NAS message included in the N2 PDU session request message to the UE 10. As described above, the NAS message includes the PDU session ID and the N1 session management container, and the N1 session management container includes the QoS rule.

In addition, the (R)AN 20-1 (MN) allocates AN tunnel information (AN Tunnel Info) to the PDU session. Here, the AN tunnel information includes a tunnel endpoint of each (R)AN node involved and QFIs allocated to respective tunnel endpoints. The (R)AN 20-1 (MN) updates the N2 session management information to be notified to the C-AMF 301-1. Here, the N2 session management information includes information such as a PDU session ID, AN tunnel information, a list of permitted or rejected QFI(s), and a User Plane Enforcement Policy Notification.

OTHER MODIFICATIONS

Each component of each of the illustrated devices is a functional concept, and does not necessarily have to be physically configured as illustrated in the figure. That is, the specific form of distribution/integration of each device is not limited to the one illustrated in the figure, and all or part of the device can be functionally or physically dispersed/integrated in any unit according to various loads and usage conditions. Note that this configuration by distribution and integration may be performed dynamically.

In addition, the above-described embodiments can be appropriately combined in a region in which the processing contents do not contradict each other. Furthermore, the order of each step illustrated in the flowchart of the above-described embodiment can be appropriately changed.

Furthermore, for example, the present embodiment can be implemented as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of part of the device).

Note that, in the present embodiment, the system means a set of a plurality of components (devices, modules (parts), etc.), and it does not matter whether all the components are in the same housing. Therefore, a plurality of devices housed in respective housings and connected via a network is a system and one device in which a plurality of modules is housed in one housing is a system.

The embodiments of the present disclosure have been described above, the technical scope of the present disclosure is not limited to the above-described embodiments as they are, and various changes can be made without departing from the gist of the present disclosure. Moreover, the components over different embodiments and modifications may be suitably combined.

Further, the effects described in the present identification are merely examples and are not limited, and other effects may be present.

The present technology may also be configured as below.

(1)

A session management method comprising:

in a process of establishing or updating one PDU session connected to an edge application server, selecting a first session management function in a home network;

selecting, based on one data network name corresponding to an application server in the home network, a first user plane function to be a PDU session anchor connected with the application server;

selecting a second session management function in a visitor network;

selecting a second user plane function to be a PDU session anchor connected, in a form of a session breakout, with the edge application servers in the visitor network;

associating the data network name with an arithmetic processing unit of at least part of the edge application server; and adding, to the PDU session, a function of distributing, based on uplink data, a transfer destination of the data to the application server via the first user plane function and the edge application server via the second user plane function.

(2)

The session management method according to the above (1), further comprising providing information pertaining to a candidate for one or more visitor networks that provide the edge application server.

(3)

The session management method according to the above (1) or (2), wherein the home network is a home PLMN (HPLMN) managed by a first public land mobile network (PLMN), the visitor network is a visitor PLMN (VPLMN) managed by a second PLMN, and the first PLMN has a roaming agreement with the second PLMN.

(4)

The session management method according to any one of the above (1) to (3), wherein the home network is an HPLMN managed by a PLMN, the visitor network is a non-public network managed by a stand-alone non-public network (SNPN), and the PLMN has a service level agreement (SLA) with the SNPN.

(5)

The session management method according to any one of the above (1) to (4), wherein the one PDU session is a PDU session via a base station device in the visitor network to which a radio terminal device is connectable.

(6)

The session management method according to any one of the above (1) to (5), further comprising:

establishing a radio bearer by dual connectivity in which a first base station device in the home network is a master node and a second base station device in the visitor network is a secondary node, wherein the PDU session includes the radio bearer.

(7)

The session management method according to the above (6), wherein the distributing function is a function of performing distribution between transfer of first traffic mapped to a first radio bearer via the master node to the application server via the first user plane function and transfer of second traffic mapped to a second radio bearer via the secondary node to the edge application server via the second user plane function.

(8)

The session management method according to any one of the above (1) to (7), wherein the first session management function is a function of instructing the second user plane function to configure, in the arithmetic processing unit, the data network name corresponding to the application server.

(9)

The session management method according to the above (2), further comprising:

acquiring information pertaining to installation of the edge application server; and selecting the candidate for one or more visitor networks based on the information pertaining to the installation of the edge application server.

(10)

A method comprising:

providing information pertaining to a candidate for one or more visitor networks;

executing a procedure for registration based on a request from a radio communication device;

generating Allowed network slice selection assistance information (NSSAI) according to the procedure for the registration; and when specific single-NSSAI (S-NSSAI) is included in the Allowed NSSAI, instructing the radio communication device to add a frequency band corresponding to a visitor network included in the candidate for the one or more visitor networks to a measurement frequency for cell selection or cell reselection.

(11)

The method according to the above (10), further comprising, when receiving a PDU session establishment request for the specific S-NSSAI from the radio communication device, instructing the radio communication device to increase a priority of the frequency band added to the measurement frequency for the cell selection or the cell reselection.

(12)

The method according to the above (10) or (11), comprising, when the specific S-NSSAI includes utilization of an application using an edge application server, adding the frequency band corresponding to the visitor network included in the candidate for the one or more visitor networks to the measurement frequency for the cell selection or the cell reselection.

(13)

The method according to any one of the above (10) to (12), further comprising instructing the radio communication device to configure Configured NSSAI including S-NSSAI provided by the one or more visitor networks.

(14)

The method according to any one of the above (10) to (13), further comprising:

when the specific S-NSSAI is not included in the Allowed NSSAI, receiving a request for registration to the specific S-NSSAI from the radio communication device, and checking whether a visitor network that provides the specific S-NSSAI is included in the candidate for the one or more visitor networks; and adding the specific S-NSSAI and updating the Allowed NSSAI when, as a result of the checking, the visitor network that provides the specific S-NSSAI is included in the candidate for the one or more visitor networks.

(15)

The method according to any one of the above (10) to (14), further including:

identifying Rejected S-NSSAI according to a procedure for the registration;

receiving a request for registration to the specific S-NSSAI that is the Rejected S-NSSAI from the radio communication device, and when the specific S-NSSAI is not available in a tracking area in which the radio communication device resides, checking whether a visitor network that provides the specific S-NSSAI is included in the candidate for the one or more visitor networks; and adding the specific S-NSSAI and updating the Allowed NSSAI when, as a result of the checking, the visitor network that provides the specific S-NSSAI is included in the candidate for the one or more visitor networks.

(16)

The method according to any one of the above (10) to (15), in which the Rejected S-NSSAI is S-NSSAI that is not allowed to be used in one or more tracking areas in a registration area, and the method further includes providing the radio communication device with the Rejected S-NSSAI and a set of one or more tracking areas that is not allowed to be used within the registration area.

(17)

The method according to any one of the above (10) to (16), further including:

identifying a second Allowed NSSAI or Conditionally Allowed NSSAI according to a procedure for the registration;

receiving, from the radio communication device, a request for registration to the second Allowed NSSAI or the specific S-NSSAI included in the Conditionally Allowed NSSAI, and when the specific S-NSSAI is not available in a tracking area in which the radio communication device resides, checking whether a visitor network that provides the specific S-NSSAI is included in the candidate for the one or more visitor networks; and adding the specific S-NSSAI and updating the Allowed NSSAI when, as a result of the checking, the visitor network that provides the specific S-NSSAI is included in the candidate for the one or more visitor networks.

(18)

The method according to any one of the above (10) to (17), in which the second Allowed NSSAI or the Conditionally Allowed NSSAI includes one or more pieces of S-NSSAI that is not allowed to be used in one or more tracking areas in the registration area and is allowed to be used in another one or more tracking areas, and the method further includes providing the second Allowed NSSAI, or the Conditionally Allowed NSSAI, and a set of the another one or more tracking areas to the radio communication device.

(19)

A radio communication method comprising:

requesting registration including one or more pieces of single-NSSAI (S-NSSAI)

included in Configured network slice selection assistance information (NSSAI); acquiring, based on the request, Allowed NSSAI;

acquiring information pertaining to a candidate for one or more visitor networks; and adding, when specific S-NSSAI is included in the Allowed NSSAI, a frequency band corresponding to a visitor network included in the candidate for the one or more visitor networks to a measurement frequency for cell selection or cell reselection.

(20)

The radio communication method according to the above (19), further comprising increasing, prior to transmitting a PDU session establishment request for the specific S-NSSAI, a priority of a frequency band corresponding to the visitor network added to the measurement frequency for the cell selection or the cell reselection.

(21)

The radio communication method according to the above (19) or (20), comprising, when the specific S-NSSAI includes utilization of an application using an edge application server, adding the frequency band corresponding to the visitor network included in the candidate for the one or more visitor networks to the measurement frequency for the cell selection or the cell reselection.

(22)

The radio communication method according to any one of the above (19) to (21), further comprising, when receiving an instruction to configure Configured NSSAI including S-NSSAI provided by the one or more visitor networks, configuring the Configured NSSAI.

(23)

The radio communication method according to any one of the above (19) to (22), further comprising:

requesting registration to the specific S-NSSAI when the specific S-NSSAI is not included in the Allowed NSSAI; and acquiring the Allowed NSSAI to which the specific S-NSSAI is added and that is updated when the visitor network providing the specific S-NSSAI is included in the candidate for the one or more visitor networks.

(24)

The radio communication method according to any one of the above (19) to (23), further including:

further acquiring, based on the request, Rejected S-NSSAI; and requesting registration to the specific S-NSSAI which is the Rejected S-NSSAI.

(25)

The radio communication method according to any one of the above (19) to (24), including:

acquiring the Rejected S-NSSAI and a set of one or more tracking areas that is not allowed to be used within a registration area; and requesting registration to the specific S-NSSAI in the one or more tracking areas that are not allowed to be used in the registration area.

(26)

The radio communication method according to any one of the above (19) to (25), including:

further acquiring second Allowed NSSAI or Conditionally Allowed NSSAI based on the request; and requesting registration to the specific S-NSSAI included in the second Allowed NSSAI or the Conditionally Allowed NSSAI.

(27)

The radio communication method according to any one of the above (19) to (26), including:

acquiring a set of the specific S-NSSAI and one or more tracking areas in which the specific S-NSSAI is allowed to be used in a registration area; and requesting registration to the specific S-NSSAI in a second tracking area different from the one or more tracking areas in the registration area.

(28)

A control method comprising:

in a process of establishing or updating one PDU session connected to an edge application server, selecting a first session management function in a home network;

selecting, based on one data network name corresponding to an application server in the home network, a first user plane function to be a PDU session anchor connected with the application server;

selecting a second session management function in a visitor network;

selecting a second user plane function to be a PDU session anchor connected, in a form of a session breakout, with the edge application servers in the visitor network;

associating the data network name with an arithmetic processing unit of at least part of the edge application server; configuring a method for determining a type of uplink data;

determining a type of the uplink data based on the configured determination method; and adding, to the PDU session, a function of distributing, based on a result of the determining, a transfer destination of the uplink data to the application server via the first user plane function and the edge application server via the second user plane function.

(29)

The control method according to the above (28), further including configuring a network data analytics function in the edge application server.

(30)

The control method according to the above (28) or (29), further including configuring a data collection coordination function in the edge application server.

(31)

The control method according to the above (29) or (30), in which the network data analytics function includes an analytics logical function, and the control method further includes executing, by the analytics logical function, inference and/or generating analysis information using a learned artificial intelligence (AI)/machine learning (ML) model.

(32)

The control method according to any one of the above (29) to (31), further including:

configuring a second network data analytics function in the application server; and acquiring, by the network data analytics function, the learned AI/ML model from the second network data analytics function.

(33)

The control method according to the above (31) or (32), in which the second network data analytics function includes a model training logical function, and the control method further includes generating, by the model training logical function, the learned AI/ML model.

(34)

The control method according to the above (28), further including configuring an extended reality (XR) media generation unit and/or an XR media encoding unit in the edge application server.

(35)

The control method according to the above (34), further including, generating, by the XR media generation unit, XR media adapted to a display region according to an adaptive media request.

(36)

The control method according to the above (34) or (35), further including encoding, by the XR media encoding unit, XR media in an adaptive format according to the adaptive media request.

(37)

The control method according to any one of the above (34) to (36), further including controlling the adaptive format based on communication quality of a radio section between a radio communication device and a base station device to which the radio communication device is connected.

(38)

The control method according to the above (37), further including selecting a high-resolution format as the adaptive format in a case where the communication quality is equal to or greater than a threshold value, and selecting a low-resolution format as the adaptive format in a case where the communication quality is less than the threshold value.

(39)

The control method according to the above (28), further including:

processing, by the application server, at least a layer of static information constituting a dynamic map and transmitting the layer of static information to a radio communication device via the first user plane function in an advanced driver-assistance systems (ADAS) or an application that assists automatic driving; and processing, by the edge application server, at least one layer of a layer of semi-static information, a layer of semi-dynamic information, and a layer of dynamic information that constitute the dynamic map, and transmitting the one layer to the radio communication device via the second user plane function.

(40)

The control method according to the above (39), in which a road side unit (Road Side Unit) in the visitor network is equipped with at least one sensor of an image sensor, a light detection and ranging (LiDAR), or a millimeter wave radar, and the control method further includes updating, by the edge application server, at least one second layer of the layer of semi-static information, the layer of semi-dynamic information, and the layer of dynamic information based on information acquired from at least the one sensor.

(41)

The control method according to the above (39) or (40), further including:

configuring a location management function (Location Management Function) in the edge application server; and calculating, by the position management function, a position of the radio communication device.

(42)

The control method according to any one of the above (39) to (41), in which a vehicle equipped with the radio communication device is equipped with at least one sensor of a global navigation satellite system (GNSS) receiver, an acceleration sensor, a gyro sensor, an image sensor, a LiDAR, and a millimeter wave radar, and the control method further includes:

configuring a network data analytics function including an analytics logical function in the edge application server;

acquiring, by the network data analytics function, sensing information detected by the at least one sensor via the radio communication device;

generating, by the analytics logical function, assist information for assisting the ADAS or the automatic driving by using the sensing information and a learned AI/ML model; and transmitting, by the network data analytics function, the assist information to the vehicle via the radio communication device.

(1A)

A Local Session Management Function (L-SMF) node located in a visitor network, the L-SMF node comprising:

one or more network interfaces;

circuitry connected to the one or more network interfaces and configured to:

receive a first N4 session establishment request from Central SMF (C-SMF) node located in a home network;

transmit a second N4 session establishment request message to a first User Plane Function (UPF) node supporting an uplink classifier or a branching point;

transmit a third N4 session establishment request message to a second UPF node which is a Local PDU Session Anchor (L-PSA), wherein the third N4 session establishment request message includes information for causing the second UPF node to assign a first Data Network Name (DNN) for a Local Data Network (L-DN), and wherein the first DNN assigned for the L-DN is the same as a second DNN assigned for a Central Data Network connected to a third UPF node which is a Central PSA (C-PSA) with which a PDU session managed by the C-SMF is established.

(2A)

The L-SMF node according to (1A), wherein the circuitry is further configured to:

receive, from the C-SMF node prior to the first N4 session establishment request, a request to operate as the L-SMF node, wherein the request to operate as the L-SMF node is based on a PDU session request from a user equipment (UE); and in response to the request to operate as the L-SMF node, transmit an acceptance to operate as the L-SMF node.

(3A)

The L-SMF node according to (1A), wherein the circuitry is further configured to:

receive a response to the second N4 session establishment request message from the first UPF node, wherein the third N4 session establishment request message is transmitted to the second UPF node based on the response to the second N4 session establishment request message;

receive a response to the third N4 session establishment request message from the second UPF node; and based on the response to the third N4 session establishment request message, transmit a response to the first N4 session establishment request to the C-SMF node.

(4A)

The L-SMF node according to (1A), wherein, based on the first DNN assigned for the L-DN being the same as the second DNN assigned for a Central Data Network, the PDU session managed by the C-SMF is a session for distributed PDU processing between a user equipment (UE) and each of the L-DN and the Central Data Network.

(5A)

A method of communication performed by a Local Session Management Function (L-SMF) node located in a visitor network, the L-SMF node including one or more network interfaces and circuitry connected to the one or more network interfaces, the method comprising:

receiving a first N4 session establishment request from Central SMF (C-SMF) node located in a home network;

transmitting a second N4 session establishment request message to a first User Plane Function (UPF) node supporting an uplink classifier or a branching point;

transmitting a third N4 session establishment request message to a second UPF node which is a Local PDU Session Anchor (L-PSA), wherein the third N4 session establishment request message includes information for causing the second UPF node to assign a first Data Network Name (DNN) for a Local Data Network (L-DN), and wherein the first DNN assigned for the L-DN is the same as a second DNN assigned for a Central Data Network connected to a third UPF node which is a Central PSA (C-PSA) with which a PDU session managed by the C-SMF is established.

(6A)

The method according to (5A), further comprising:

receiving, from the C-SMF node prior to the first N4 session establishment request, a request to operate as the L-SMF node, wherein the request to operate as the L-SMF node is based on a PDU session request from a user equipment (UE); and in response to the request to operate as the L-SMF node, transmitting an acceptance to operate as the L-SMF node.

(7A)

The method according to (5A), further comprising:

receiving a response to the second N4 session establishment request message from the first UPF node, wherein the third N4 session establishment request message is transmitted to the second UPF node based on the response to the second N4 session establishment request message;

receiving a response to the third N4 session establishment request message from the second UPF node; and based on the response to the third N4 session establishment request message, transmitting a response to the first N4 session establishment request to the C-SMF node.

(8A)

The method according to (5A), wherein, based on the first DNN assigned for the L-DN being the same as the second DNN assigned for a Central Data Network, the PDU session managed by the C-SMF is a session for distributed PDU processing between a user equipment (UE) and each of the L-DN and the Central Data Network.

(9A)

A non-transitory computer-readable product containing instructions for causing a device configured as a Local Session Management Function (L-SMF) node located in a visitor network to perform a method, the method comprising:

receiving a first N4 session establishment request from Central SMF (C-SMF) node located in a home network;

transmitting a second N4 session establishment request message to a first User Plane Function (UPF) node supporting an uplink classifier or a branching point;

transmitting a third N4 session establishment request message to a second UPF node which is a Local PDU Session Anchor (L-PSA), wherein the third N4 session establishment request message includes information for causing the second UPF node to assign a first Data Network Name (DNN) for a Local Data Network (L-DN), and wherein the first DNN assigned for the L-DN is the same as a second DNN assigned for a Central Data Network connected to a third UPF node which is a Central PSA (C-PSA) with which a PDU session managed by the C-SMF is established.

(10A)

The non-transitory computer-readable product of (9A), wherein the method further comprises:

receiving, from the C-SMF node prior to the first N4 session establishment request, a request to operate as the L-SMF node, wherein the request to operate as the L-SMF node is based on a PDU session request from a user equipment (UE); and in response to the request to operate as the L-SMF node, transmitting an acceptance to operate as the L-SMF node.

(11A)

The non-transitory computer-readable product of (9A), wherein the method further comprises:

receiving a response to the second N4 session establishment request message from the first UPF node, wherein the third N4 session establishment request message is transmitted to the second UPF node based on the response to the second N4 session establishment request message;

receiving a response to the third N4 session establishment request message from the second UPF node; and based on the response to the third N4 session establishment request message, transmitting a response to the first N4 session establishment request to the C-SMF node.

(12A)

The non-transitory computer-readable product of (9A), wherein, based on the first DNN assigned for the L-DN being the same as the second DNN assigned for a Central Data Network, the PDU session managed by the C-SMF is a session for distributed PDU processing between a user equipment (UE) and each of the L-DN and the Central Data Network.

REFERENCE SIGNS LIST

10 UE
20, 20-1, 20-2 (R)AN
30, 30-1, 30-2 5GC
40-1 Application server
40-2 Edge application server
301, 301-1, 301-2 AMF
302, 302-1, 302-2 NEF
305, 305-1, 305-2 PCF
306, 306-1 SMF
307, 307-1 UDM
308, 308-1 AF
311, 311-1, 311-2 EASDF
330, 330-1, 330-21, 330-22 UPF
340, 340-1, 340-2 DN

The invention claimed is:

1. A Local Session Management Function (L-SMF) node located in a visitor network, the L-SMF node comprising:
one or more network interfaces;
circuitry connected to the one or more network interfaces and configured to:
receive a first message from a Central SMF (C-SMF) node located in a home network, the first message including information associated with an N4 session configured by the L-SMF node;
transmit a second message to a first User Plane Function (UPF) node supporting an uplink classifier or a branching point, the second message including information to configure an N4 rule in the first UPF node;
transmit a third message to a second UPF node which is a Local PDU Session Anchor (L-PSA),
wherein the third message includes information to provide a first Data Network Name (DNN) to the second UPF node for a Local Data Network (L-DN), and
wherein the first DNN provided for the L-DN is the same as a second DNN associated with a PDU session associated with the C-SMF for a Central Data Network (C-DN).

2. The L-SMF node according to claim 1, wherein the circuitry is further configured to:
receive, prior to receiving the first request message, a request to operate as an SMF node,
wherein the request to operate as the SMF node is based on a PDU session request from a user equipment (UE); and
in response to the request to operate as the SMF node, transmit an acceptance to operate as the SMF node.

3. The L-SMF node according to claim 1, wherein the circuitry is further configured to:
receive a response to the second message from the first UPF node, and
receive a response to the message from the second UPF node.

4. The L-SMF node according to claim 1, wherein, based on the first DNN assigned for the L-DN being the same as the second DNN assigned for the C-DN, the PDU session managed by the C-SMF is a session for distributed PDU processing between a user equipment (UE) and each of the L-DN and the C-DN.

5. The L-SMF node according to claim 1, wherein the first message includes a request to establish an N4 session.

6. The L-SMF node according to claim 1, wherein the second message includes a request for the first UPF to establish an N4 session, and the third message includes a request for the second UPF to establish an N4 session.

7. A method of communication performed by a Local Session Management Function (L-SMF) node located in a visitor network, the L-SMF node including one or more network interfaces and circuitry connected to the one or more network interfaces, the method comprising:
receiving a first message from Central SMF (C-SMF) node located in a home network, the first message including information associated with an N4 session configured by the L-SMF node;
transmitting a second message to a first User Plane Function (UPF) node supporting an uplink classifier or a branching point, the second message including information to configure an N4 rule in the first UPF node;
transmitting a third message to a second UPF node which is a Local PDU Session Anchor (L-PSA),
wherein the third message includes information to provide a first Data Network Name (DNN) to the second UPF node for a Local Data Network (L-DN), and
wherein the first DNN provided for the L-DN is the same as a second DNN associated with a PDU session associated with the C-SMF for a Central Data Network (C-DN).

8. The method according to claim 7, further comprising:
receiving, prior to said receiving the first request message, a request to operate as an SMF node, wherein the request to operate as the SMF node is based on a PDU session request from a user equipment (UE); and
in response to the request to operate as the SMF node, transmitting an acceptance to operate as the SMF node.

9. The method according to claim 7, further comprising:
receiving a response to the second message from the first UPF node, and
receiving a response to the message from the second UPF node.

10. The method according to claim 7, wherein, based on the first DNN assigned for the L-DN being the same as the second DNN assigned for the C-DN, the PDU session managed by the C-SMF is a session for distributed PDU processing between a user equipment (UE) and each of the L-DN and the C-DN.

11. The method according to claim 7, wherein the first message includes a request to establish an N4 session.

12. The method according to claim 7, wherein the second message includes a request for the first UPF to establish an N4 session, and the third message includes a request for the second UPF to establish an N4 session.

13. A non-transitory computer-readable product containing instructions for causing a device configured as a Local Session Management Function (L-SMF) node located in a visitor network to perform a method, the method comprising:
receiving a first message from Central SMF (C-SMF) node located in a home network, the first message including information associated with an N4 session configured by the L-SMF node;
transmitting a second message to a first User Plane Function (UPF) node supporting an uplink classifier or a branching point, the second message including information to configure an N4 rule in the first UPF node;
transmitting a third message to a second UPF node which is a Local PDU Session Anchor (L-PSA), wherein the third message includes information to provide a first Data Network Name (DNN) to the second UPF node for a Local Data Network (L-DN), and wherein the first DNN provided for the L-DN is the same as a second DNN associated with a PDU session associated with the C-SMF for a Central Data Network (C-DN).

14. The non-transitory computer-readable product of claim 13, wherein the method further comprises:

receiving, prior to said receiving the first request message, a request to operate as an SMF node, wherein the request to operate as the SMF node is based on a PDU session request from a user equipment (UE); and in response to the request to operate as the SMF node, transmitting an acceptance to operate as the SMF node.

15. The non-transitory computer-readable product of claim 13, wherein the method further comprises:

receiving a response to the second message from the first UPF node, and receiving a response to the message from the second UPF node.

16. The non-transitory computer-readable product of claim 13, wherein, based on the first DNN assigned for the L-DN being the same as the second DNN assigned for the C-DN, the PDU session managed by the C-SMF is a session for distributed PDU processing between a user equipment (UE) and each of the L-DN and the C-DN.

17. The non-transitory computer-readable product of claim 13, wherein the first message includes a request to establish an N4 session.

18. The L-SMF node according to non-transitory computer-readable product of claim 13, wherein the second message includes a request for the first UPF to establish an N4 session, and the third message includes a request for the second UPF to establish an N4 session.

19. A Local Session Management Function (L-SMF) node located in a visitor network, the L-SMF node comprising:

one or more network interfaces;

circuitry connected to the one or more network interfaces and configured to:

receive a first message from a Central Session Management Function (C-SMF) node located in a home network, the first message including information associated with a session configured by the L-SMF node;

transmit a second message to a first user data node supporting an uplink classifier or a branching point, the second message including information to configure a traffic control rule in the first UPF node;

transmit a third message to a second user data node which is a local session anchor, wherein the third message includes information to provide a first Data Network Name (DNN) to the second UPF node for a Local Data Network (L-DN), and wherein the first DNN provided for the L-DN is the same as a second DNN associated with a session associated with the C-SMF for a Central Data Network (C-DN).

* * * * *